US012745780B2

(12) United States Patent
Iommi-Chittwood et al.

(10) Patent No.: US 12,745,780 B2
(45) Date of Patent: Sep. 29, 2026

(54) SEAFOOD PROCESSING SYSTEM AND RELATED METHODS

(71) Applicant: Joey Namm Iommi-Chittwood, Lafayette, LA (US)

(72) Inventors: Joey Namm Iommi-Chittwood, Lafayette, LA (US); Aron K Madsen, Eagle Mountain, UT (US); Andrew Clawson, Provo, UT (US); Philip Bernhard Klocke, Provo, UT (US); Jason Prescott, West Jordan, UT (US); Megan Nicole Stickley, Provo, UT (US); Jacob Kimball Taylor, Provo, UT (US); Tyler Vail, Paradise, CA (US); Jeremy Pearson, Los Lunas, NM (US)

(73) Assignee: Joey Namm Iommi-Chittwood, Lafayette, LA (US)

( * ) Notice: Subject to any disclaimer, the term of this patent is extended or adjusted under 35 U.S.C. 154(b) by 55 days.

(21) Appl. No.: 18/606,307

(22) Filed: Mar. 15, 2024

(65) Prior Publication Data

US 2024/0306655 A1 Sep. 19, 2024

Related U.S. Application Data

(60) Provisional application No. 63/452,913, filed on Mar. 17, 2023.

(51) Int. Cl.

| | |
|---|---|
| ***A22C 29/00*** | (2006.01) |
| ***A22C 29/02*** | (2006.01) |
| ***B25J 11/00*** | (2006.01) |
| ***B25J 15/12*** | (2006.01) |

(52) U.S. Cl.
CPC ............ *A22C 29/02* (2013.01); *B25J 11/005* (2013.01); *B25J 15/12* (2013.01)

(58) Field of Classification Search
CPC . A22C 29/02; B25J 1/005; B25J 15/12; B25J 11/00; B25J 15/00; B25J 15/0004; B25J 15/0009; B25J 15/0206; B25J 15/022; B65G 47/001
USPC .................................... 901/14, 30, 31; 452/1
See application file for complete search history.

(56) References Cited

U.S. PATENT DOCUMENTS

| | | | | |
|---|---|---|---|---|
| 3,758,921 | A | 9/1973 | Ingalls | |
| 4,928,352 | A | 5/1990 | Thibodeaux | |
| 5,055,085 | A | 10/1991 | Thibodeaux | |
| 12,162,139 | B1 * | 12/2024 | Gonzalez Diaz | B25J 15/08 |
| 2019/0321984 | A1 * | 10/2019 | Yamazaki | B25J 9/0093 |
| 2020/0338749 | A1 * | 10/2020 | Machida | B25J 9/023 |
| 2020/0346792 | A1 * | 11/2020 | Curhan | B25J 15/10 |
| 2021/0129355 | A1 * | 5/2021 | Son | B25J 15/0033 |

(Continued)

*Primary Examiner* — Richard T Price, Jr.

(74) *Attorney, Agent, or Firm* — Veros Legal Solutions, LLP

(57) ABSTRACT

Seafood processing systems, for example crustacean processing systems, and related methods are disclosed herein. Such systems are configured to clean, deshell and/or eviscerate seafood, including but not limited to crawfish, shrimp, prawns and/or lobster utilizing one or more systems, subsystems, and/or combinations thereof, as disclosed anywhere herein. Such methods may include utilizing any such systems to clean, deshell and/or eviscerate seafood, including but not limited to crawfish, shrimp, prawns and/or lobster, in any manner, or using any procedure(s) disclosed or intimated herein.

21 Claims, 26 Drawing Sheets

(56) References Cited

U.S. PATENT DOCUMENTS

| | | | | |
|---|---|---|---|---|
| 2021/0187755 | A1* | 6/2021 | Lessing | B25J 15/10 |
| 2022/0161427 | A1* | 5/2022 | Yerazunis | B25J 9/1674 |

* cited by examiner

SEAFOOD PROCESSING SYSTEM AND RELATED METHODS

CROSS-REFERENCE TO RELATED APPLICATIONS

This application claims priority to U.S. Provisional Application No. 63/452,913, filed on Mar. 17, 2023, the entire contents of which is hereby incorporated by reference.

BACKGROUND OF THE INVENTION

The present disclosure relates to seafood cleaning, deshelling and eviscerating systems and related methods.

Seafood is a popular meal choice, especially in the southern, coastal states of the United States. However, cleaning and preparing some types of seafood, for example crawfish, can be a time and labor-intensive process. Many attempts at machines capable of cleaning and preparing crawfish have been made. However, none to date have been sufficiently successful for widespread adoption by the seafood industry. Accordingly, a need exists for seafood cleaning, deshelling and eviscerating systems and related methods.

SUMMARY OF THE INVENTION

In some embodiments, a system for processing seafood is provided. The system includes a seafood orienting subsystem. The seafood orienting subsystem includes a robotic gripper assembly configured to grip a head of a crustacean and adjust a position and orientation of the gripped crustacean. The robotic gripper assembly includes a first plurality of gripper fingers, each disposed a predetermined lateral distance from adjacent ones of the first plurality of gripper fingers. The robotic gripper assembly includes a second plurality of gripper fingers, each disposed the predetermined lateral distance from adjacent ones of the second plurality of gripper fingers. Each of the second plurality of gripper fingers is disposed opposite a respective one of the first plurality of gripper fingers, each pair of opposing first and second gripper fingers forming an individually controllable gripping unit.

In some embodiments, the seafood orienting subsystem further includes a horizontal rail, a carriage configured to translate horizontally along the horizontal rail, and a vertical rail configured to vertically translate along and with respect to the carriage. The robotic gripper assembly is rotatably coupled to the vertical rail such that the position of the gripped crustacean is horizontally translatable by translating the carriage along the horizontal rail, the position of the gripped crustacean is vertically translatable by translating the vertical rail along the carriage, and the orientation of the gripped crustacean is rotatable about an axis of rotation of the robotic gripper assembly by rotating the robotic gripper assembly with respect to the vertical rail.

In some embodiments, based on at least one control signal received from a control subsystem, the seafood orienting subsystem is configured to position the robotic gripper assembly such that the first plurality of gripper fingers and the second plurality of gripper fingers are open and disposed adjacent opposite sides of the head of the crustacean in a first position and orientation, close one or more of the individually controllable gripping units by a predetermined amount to, thereby, grip the head of the crustacean, and perform predetermined amounts of translating the carriage along the horizontal rail, translating the vertical rail along the carriage, and rotating the robotic gripper assembly to transfer the gripped crustacean to a second position and orientation that is vertically and horizontally aligned with a tail removing subsystem.

In some embodiments, the second position and orientation includes the gripped crustacean being oriented with a tail extending away from the robotic gripper assembly and towards the tail removing subsystem.

In some embodiments, the system includes a tail removing subsystem configured to uncurl a tail of the crustacean, grip the tail, separate the gripped tail from the gripped head, and remove tail meat from a shell of the crustacean. The tail removing subsystem includes a tail gripping assembly. The tail gripping assembly includes a first gripping paddle and a second gripping paddle. The first gripping paddle includes at least one blower rail extending from a front edge of the gripping paddle. The first gripping paddle includes at least one blower nozzle or blower duct disposed on the blower rail and configured to direct a stream of compressed air against a belly of the crustacean while the tail is in a curled configuration to, thereby, uncurl the tail. The first gripping paddle includes an injector nozzle configured to pierce the shell of the uncurled tail and inject compressed air between the shell and tail meat of the crustacean to, thereby, eject the tail meat from the shell. The first and second gripping paddles are configured to cooperate to grip the uncurled tail of the crustacean. The tail gripping assembly is configured to rotate and, thereby, twist the gripped tail of the crustacean while the robotic gripping assembly is gripping the head of the crustacean to, thereby, separate the gripped tail from the gripped head.

In some embodiments, the tail removing subsystem includes a horizontal rail, and a carriage configured to translate horizontally along the horizontal rail. The tail gripper assembly is rotatably coupled to the carriage.

In some embodiments, based on at least one control signal received from a control subsystem, the tail removing subsystem is configured to rotate the tail gripping assembly by a predetermined amount such that the first paddle is facing the belly of the crustacean when the crustacean is vertically and horizontally aligned with the tail gripping assembly, horizontally translate the carriage along the horizontal rail by a predetermined amount to, thereby, extend the tail gripping assembly sufficiently that at least a portion of the curled tail of the crustacean is disposed adjacent the blower nozzle or blower duct and between the first and second gripping paddles, direct a stream of compressed air from the blower nozzle or blower duct against the belly of the crustacean to, thereby, uncurl the tail, close the first and second gripping paddles by a predetermined amount to grip the uncurled tail of the crustacean and simultaneously cause the injector nozzle to pierce the shell of the uncurled tail, rotate the tail gripping assembly with respect to the carriage by a predetermined amount to, thereby, separate the gripped head from the gripped tail, and inject compressed air between the shell and tail meat of the crustacean to, thereby, eject the tail meat from the shell.

In some embodiments, the at least one blower nozzle is disposed at an angle of approximately 45 degrees with respect to the blower rail to maximize the efficiency of the compressed air at uncurling the tail of the crustacean.

In some embodiments, the at least one blower rail includes a first blower rail extending from a first lateral side of the front edge of the first gripping paddle, and a second blower rail extending from a second lateral side of the front edge of the first gripping paddle opposite the first lateral side.

In some embodiments, the at least one blower nozzle includes a first plurality of blower nozzles extending away from the first blower rail at an angle back toward a proximal portion of the first gripping paddle, and a second plurality of blower nozzles extending away from the second blower rail at an angle back toward the proximal portion of the first gripping paddle.

In some embodiments, the angle at which the first plurality of blower nozzles extend away from the first blower rail is also tipped toward a centerline of the first gripping paddle so as to direct the stream of compressed air toward the centerline of the first gripping paddle, and a second plurality of blower nozzles extending away from the second blower rail at an angle back toward the proximal portion of the first gripping paddle.

In some embodiments, the at least one blower duct includes a first blower duct having an elongated cross-section disposed in the first blower rail and configured to direct the stream of compressed air at an angle back toward a proximal portion of the first gripping paddle, and a second blower duct having the elongated cross-section disposed in the second blower rail and configured to direct the stream of compressed air at an angle back toward the proximal portion of the first gripping paddle.

In some embodiments, a position of the injector nozzle is adjustable with respect to the first gripping paddle in at least one dimension based at least in part on a position of the tail of the crustacean.

In some embodiments, an inward facing surface of the second gripper paddle includes a longitudinal groove configured to receive the tail of the crustacean and, thereby, prevent crushing of the tail while being gripped between the first and second gripping paddles.

In some embodiments, the system includes an eviscerating subsystem configured to immobilize the tail meat of the crustacean and eviscerate the entrails of the tail meat. The eviscerating subsystem includes an immobilizing assembly including a plurality of immobilizing elements configured to be individually extended from the immobilizing assembly. The eviscerating subsystem includes a slewing bearing disposed adjacent to the immobilizing assembly. The eviscerating subsystem includes a carrier coupled to the slewing bearing and configured to move in a substantially circular path about the slewing bearing. The eviscerating subsystem includes an extendible vacuum port coupled to the carrier and oriented toward a center of the slewing bearing.

In some embodiments, based on at least one control signal received from a control subsystem, the eviscerating subsystem is configured to dispose the tail meat aligned with the center of the slewing bearing, extend a first subset of the plurality of immobilizing elements disposed directly over meat portions of the tail meat to contact the tail meat and retract a second subset of the plurality of immobilizing elements disposed directly over entrails within the tail meat, rotate the carrier on the slewing bearing so as to dispose the extendible vacuum port adjacent an end of the tail meat previously connected to the head of the crustacean, extend the extendible vacuum port to position the vacuum port immediately adjacent the end of the tail meat previously connected to the head of the crustacean, and rotate the carrier on the slewing bearing such that the distal end of the vacuum port passes along a convex side of the tail meat from the end of the tail meat previously connected to the head to an opposite end of the tail meat, thereby, eviscerating the entrails from the tail meat. In some embodiments, the immobilizing elements include needles.

In some embodiments, the system includes a vision subsystem configured to make one or more determinations related to controlling the system based on analysis of one or more captured images of the crustacean disposed within the system. The vision subsystem includes at least one camera configured to capture one or more images of the crustacean prior to being gripped by the robotic gripper assembly, and at least one processor. The vision subsystem includes at least one memory including non-transient computer readable medium including code that, when executed by the at least one processor, causes the vision subsystem to cause the at least one camera to capture and/or generate the one or more images of the crustacean prior to being gripped by the robotic gripper assembly, analyze the one or more images of the crustacean prior to being gripped by the robotic gripper assembly to determine an orientation of the crustacean, and generate at least one indication of the determined orientation of the crustacean for use by a control subsystem to generate one or more control signals for at least one of: positioning the robotic gripper assembly such that the first plurality of gripper fingers and the second plurality of gripper fingers are open and disposed adjacent opposite sides of the head of the crustacean in a first position and orientation, closing one or more of the individually controllable gripping units by a predetermined amount to, thereby, grip the head of the crustacean, and performing predetermined amounts of translating the carriage along the horizontal rail, translating the vertical rail along the carriage, and rotating the robotic gripper assembly to transfer the gripped crustacean to a second position and orientation that is vertically and horizontally aligned with a tail removing subsystem.

In some embodiments, the orientation of the crustacean includes at least one of a head-first determination, a tail-first determination, a relative axial-orientation of a belly of the crustacean, a location of the crustacean on a conveyor belt, identification of a cephalothorax of the crustacean, and identification of an abdomen of the crustacean.

In some embodiments, the system includes a vision subsystem configured to make one or more determinations related to controlling the system based on analysis of one or more captured images of the crustacean disposed within the system. The vision subsystem includes at least one camera configured to capture one or more images of the crustacean while being gripped by the robotic gripper assembly. The vision subsystem includes at least one processor. The vision subsystem includes at least one memory including non-transient computer readable medium including code that, when executed by the at least one processor, causes the vision subsystem to: cause the at least one camera to capture and/or generate the one or more images of the crustacean while being gripped by the robotic gripper assembly, analyze the one or more images of the crustacean while being gripped by the robotic gripper assembly to determine an axial orientation of the crustacean, and generate at least one indication of the determined axial orientation of the crustacean for use by the control subsystem to generate one or more control signals for at least one of: rotating the tail gripping assembly by a predetermined amount such that the first gripping paddle is facing the belly of the crustacean when the crustacean is vertically and horizontally aligned with the tail gripping assembly, horizontally translating the carriage along the horizontal rail by a predetermined amount to, thereby, extend the tail gripping assembly sufficiently to dispose at least a portion of the curled tail of the crustacean adjacent the blower nozzle or blower duct and between the first and second gripping paddles, directing a stream of compressed air from the at least one blower nozzle or blower duct against the belly of the crustacean to, thereby, uncurl the tail, closing the first and second gripping paddles by a predetermined amount to grip the uncurled tail of the crustacean and simultaneously cause the injector nozzle to pierce the shell of the uncurled tail, rotating the tail gripping assembly with respect to the carriage by a predetermined amount to, thereby, separate the gripped head from the gripped tail, and injecting compressed air through the injection nozzle between the shell and tail meat of the crustacean to, thereby, eject the tail meat from the shell.

In some embodiments, the system includes a vision subsystem configured to make one or more determinations related to controlling the system based on analysis of one or more captured images of the crustacean disposed within the system. The vision subsystem includes at least one camera configured to capture one or more images of the crustacean prior to being gripped by the robotic gripper assembly, and at least one processor. The vision subsystem includes at least one memory including non-transient computer readable medium including code that, when executed by the at least one processor, causes the vision subsystem to: cause the at least one camera to capture and/or generate the one or more images of the crustacean tail meat disposed within the eviscerating subsystem, analyze the one or more images of the crustacean tail meat disposed within the eviscerating subsystem to determine portions of the tail meat including entrails, and generate at least one indication of the portions of the tail meat determined to include entrails for use by the control subsystem to generate one or more control signals for at least one of: extending a first subset of the plurality of immobilizing elements to contact portions of the tail meat determined to not include entrails and retracting a second subset of the plurality of immobilizing elements and avoid contact with the portions of the tail meat determined to include entrails, rotating the carrier on the slewing bearing so as to dispose the extendible vacuum port adjacent an end of the tail meat previously connected to the head of the crustacean, controlling extension of the extendible vacuum port to position the vacuum port immediately adjacent the end of the tail meat previously connected to the head of the crustacean, and rotating the carrier on the slewing bearing such that the distal end of the vacuum port passes along a convex side of the tail meat from the end of the tail meat previously connected to the head to an opposite end of the tail meat, thereby, eviscerating the entrails from the tail meat.

In some embodiments, a method of processing seafood is provided. The method includes orienting a crustacean in one of a substantially head-first orientation or a substantially tail-first orientation. The method includes determining, utilizing a vision subsystem of a seafood processing system, an orientation of the crustacean. The method includes transferring the crustacean to a second position and orientation that is vertically and horizontally aligned with a tail removing subsystem of the seafood processing system. The method includes separating the tail from the head of the crustacean utilizing the tail removing subsystem. The method includes collecting yellow fat from at least one of the tail in the shell and the separated head. The method includes remove tail meat from the shell of the crustacean utilizing the tail removing subsystem. The method includes determining, utilizing the vision subsystem, portions of the tail meat including entrails. The method includes evacuating the entrails from the tail meat, thereby retaining cleaned tail meat of each crustacean. In some embodiments, the method includes providing the cleaned tail meat to an output of the seafood cleaning system. In some embodiments, the method includes verifying, utilizing the vision subsystem, whether the meat has been acceptably cleaned and eviscerated.

In some embodiments, orienting the crustacean in one of the substantially head-first orientation or the substantially tail-first orientation includes disposing the crustacean onto slanted sides of a yaw-orienting subsystem while a conveyor belt of the yaw-orienting subsystem is driven, thereby, causing the crustacean to automatically orient in substantially parallel to a direction of travel of the conveyor belt and in either the head-first orientation or the tail-first orientation.

In some embodiments, determining the orientation of the crustacean includes one of causing at least one camera of the vision subsystem to capture or generate one or more images of the crustacean disposed at a distal end of the conveyor belt, or causing at least one camera of the vision subsystem to capture or generate one or more images of the crustacean while the crustacean is being gripped by a robotic gripping assembly and vertically and horizontally aligned with the tail removing subsystem. The determining the orientation of the crustacean further includes analyzing the one or more images to identify features of the crustacean to determine at least one of a head-first determination, a tail-first determination, an axial-orientation of the crustacean, a location of the crustacean on the conveyor belt, identification of a cephalothorax of the crustacean, and identification of a tail section of the crustacean.

In some embodiments, transferring the crustacean to the second position and orientation includes positioning a robotic gripper assembly of a seafood orienting subsystem such that a first plurality of gripper fingers and a second plurality of gripper fingers are open and disposed adjacent opposite sides of a head of the crustacean in a first position and orientation, closing one or more individually controllable gripping units, including opposing pairs of the first and second gripper fingers, by a predetermined amount to, thereby, grip the head of the crustacean, and performing predetermined amounts of: translating a carriage of the seafood orienting subsystem along a horizontal rail of the seafood orienting subsystem, translating a vertical rail along the carriage, and rotating the robotic gripper assembly to transfer the gripped crustacean to the second position and orientation that is vertically and horizontally aligned with the tail removing subsystem.

In some embodiments, separating the tail from the head of the crustacean utilizing the tail removing subsystem includes rotating a tail gripping assembly of the tail removing subsystem by a predetermined amount such that a first gripping paddle of the tail removing subsystem is facing a belly of the crustacean when the crustacean is vertically and horizontally aligned with the tail gripping assembly, horizontally translating a carriage of the tail removing subsystem along a horizontal rail of the tail removing subsystem by a predetermined amount to, thereby, extend the tail gripping assembly sufficiently that at least a portion of the tail of the crustacean is disposed adjacent blower nozzles or blower ducts of the first gripping paddle and between the first gripping paddle and a second gripping paddle of the tail gripping assembly, directing a stream of compressed air from the blower nozzles or the blower ducts against the belly of the crustacean to, thereby, uncurl the tail, closing the first and second gripping paddles by a predetermined amount to grip the uncurled tail of the crustacean and simultaneously cause an injector nozzle of the first gripping paddle to pierce the shell of the uncurled tail, and rotate the tail gripping assembly with respect to the carriage by a predetermined amount to, thereby, separate the gripped head from the gripped tail.

In some embodiments, collecting the yellow fat includes disposing a vacuum port of the tail removing subsystem in an orientation suitable to suction the yellow fat from at least one of: the tail while the tail is secured by the tail clamping assembly, and the head while the head is gripped by the robotic gripper assembly.

In some embodiments, closing the first and second gripping paddles by the predetermined amount to grip the uncurled tail of the crustacean simultaneously causes an injector nozzle of the first gripper paddle to pierce the shell of the uncurled tail, and removing the tail meat from the shell of the crustacean utilizing the tail removing subsystem includes causing the injector nozzle to inject compressed air between the shell and tail meat of the crustacean to, thereby, eject the tail meat from the shell.

In some embodiments, determining portions of the tail meat including entrails includes causing at least one camera of the vision subsystem to capture or generate one or more images of the crustacean tail meat disposed within the eviscerating subsystem, and analyzing the one or more images of the crustacean tail meat disposed within the eviscerating subsystem to determine portions of the tail meat including entrails.

In some embodiments, evacuating the entrails from the tail meat includes extending a first subset of a plurality of immobilizing elements of an eviscerating subsystem to contact portions of the tail meat determined to not include entrails, retracting a second subset of the plurality of immobilizing elements to avoid contact with portions of the tail meat determined to include the entrails, rotating a carrier on a slewing bearing of the eviscerating subsystem so as to dispose an extendible vacuum port adjacent an end of the tail meat previously connected to the head of the crustacean, extending the extendible vacuum port to position a distal end of the vacuum port immediately adjacent the end of the tail meat previously connected to the head of the crustacean, and rotating the carrier on the slewing bearing such that the distal end of the vacuum port passes along a convex side of the tail meat from the end of the tail meat previously connected to the head to an opposite end of the tail meat, thereby, eviscerating the entrails from the tail meat.

In some embodiments, the method of processing seafood includes verifying, utilizing the vision subsystem, whether the meat has been acceptably cleaned and eviscerated.

BRIEF DESCRIPTION OF DRAWINGS

A more complete appreciation of the subject matter of the present disclosure and of the various advantages thereof can be realized by reference to the following detailed description in which reference is made to the accompanying drawings in which.

DETAILED DESCRIPTION OF THE INVENTION

Example System

Figure 1:
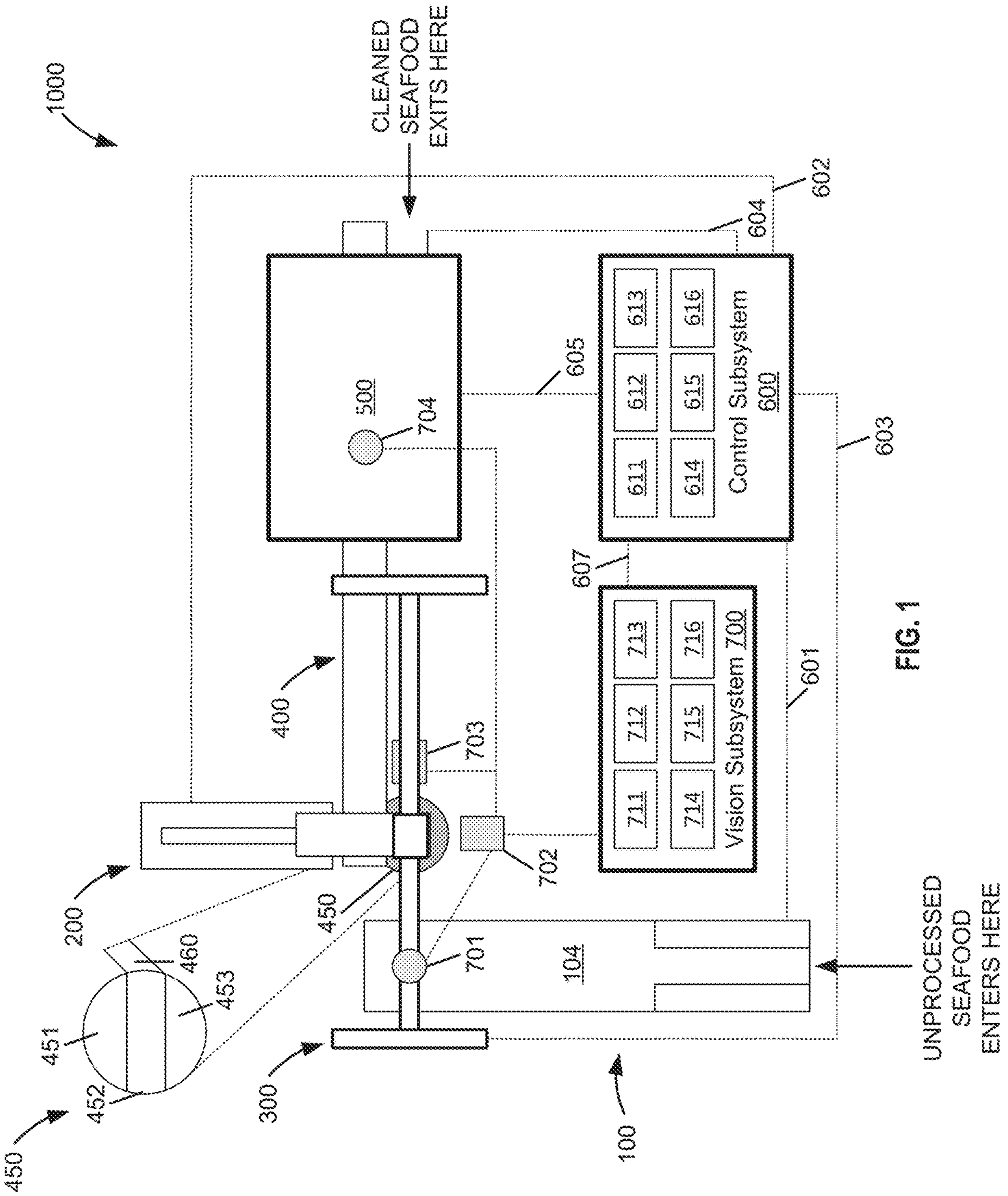
FIG. 1 is a schematic diagram of a seafood processing system, according to some example embodiments.

The present disclosure relates to seafood processing apparatuses, systems and/or related methods. FIG. 1 is a perspective view of a seafood processing system 1000, according to some example embodiments. System 1000 is configured to process seafood, for example crustaceans including but not limited to, lobster, prawns, crawfish and/or shrimp. Accordingly, anywhere in this description an apparatus or process is described in connection with crawfish, shrimp or any other seafood, this disclosure also explicitly contemplates compatibility and/or suitability of use in connection with any type of seafood, for example crustaceans including but not limited to lobster, prawns crawfish and/or shrimp.

System 100 may provide at least a minimum capacity (e.g., cleaning at least 30 crawfish and/or shrimp per minute, though the present disclosure is not so limited) as will be described in more detail in this disclosure. System 1000 comprises one or more of a yaw-orienting subsystem 100, a tail gripper subsystem 200, a seafood orienting subsystem 300, a conveyor belt subsystem 400, an eviscerating subsystem 500, a control subsystem 600 and a vision subsystem 700.

Together, system 1000 is configured to take randomly oriented crawfish, position each appropriately for processing, uncurl the tail, remove the tail, collect the yellow fat, remove tail meat from the shell, eviscerate entrails from the tail meat, and/or determine whether the tail meat has been satisfactorily cleaned and/or eviscerated.

Yaw-orienting subsystem 100 is configured to receive crawfish and/or shrimp in arbitrary, or random, orientations and individually adjust each of their orientations to extend in a predetermined direction and/or to have a predetermined orientation, which in some embodiments may be a substantially superior-inferior direction, extending longitudinally in a direction through the head and tail, either head-first or tail-first with respect to a direction of travel of a conveyor belt 104 of subsystem 100. In some such embodiments, any movement, operation and/or function of yaw-orienting subsystem 100 may be controlled by control subsystem 600 alone or based on input from vision subsystem 700.

Seafood orienting subsystem 300 is configured to grip each crawfish and/or shrimp by the head, or immediately adjacent the head, in preparation for interaction with tail gripping and meat-separating subsystem 200 as described anywhere in this disclosure. Gripping of the head or immediately adjacent thereto simplifies the tail uncurling process described below. Seafood orienting subsystem 300 is also configured to move the crawfish and/or shrimp from yaw-orienting subsystem 100 and position the gripped crawfish and/or shrimp for tail engagement with tail gripping and meat-separating subsystem 200 as described anywhere in this disclosure. In some such embodiments, any movement, operation and/or function of seafood orienting subsystem 300 may be controlled by control subsystem 600 alone or based on input from vision subsystem 700.

Tail gripping and meat-separating subsystem 200 is configured to remove the clamped tail from the clamped head. For example, an end effector 310 (e.g., a robotic gripper assembly as shown or described anywhere in this disclosure) may hold the gripped head of the crawfish and/or shrimp stationary while at least a portion of subsystem 200 rotates to align itself with the crawfish and/or shrimp, directs compressed gas (e.g., air) along a curled portion of the body, abdomen and/or tail of the crawfish and/or shrimp to uncurl the body and/or tail, clamps the tail of the crawfish and/or shrimp in the substantially uncurled orientation, and then twists and/or pulls the clamped tail until the head separates from the abdomen/tail as described anywhere in this disclosure. Subsystem 200 is also configured to separate the tail meat from the shell of the tail, for example and not limitation, by puncturing the underbelly of the crawfish and/or shrimp with another air injector nozzle, thereby making a small hole in the shell, and injecting air into a space between the meat and the shell, thereby forcing the meat out of the shell (e.g., ejecting the tail meat from within the shell) as described anywhere in this disclosure. In some embodiments, subsystem 200 or another subsystem may also be configured to collect the yellow fat before and/or after the meat is separated from the tail shell, as described anywhere in this disclosure. In some embodiments, any movement, operation and/or function of tail gripping and meat-separating subsystem 200 described anywhere in this disclosure may be controlled by control subsystem 600 alone or based on input from vision subsystem 700.

Conveyor belt subsystem 400 is configured to convey the ejected tail meat of the crawfish and/or shrimp to and/or through eviscerating subsystem 500 after removal of the head and shell. In some embodiments, any movement, operation and/or function of conveyor belt subsystem 400 may be controlled by control subsystem 600 alone or based on input from vision subsystem 700.

Eviscerating subsystem 500 may be configured to substantially immobilize at least a portion of each headless, deshelled crawfish and/or shrimp tail meat and eviscerate the entrails thereof, for example utilizing a vacuum apparatus as described anywhere in this disclosure. In some embodiments, any movement, operation and/or function of eviscerating subsystem 500 may be controlled by control subsystem 600 alone or based on input from vision subsystem 700. For example, and not limitation, In some embodiments, control subsystem 600 may be configured to determine an orientation of each crawfish tail meat, and/or to identify one or more features of each crawfish tail meat relevant to immobilizing and/or eviscerating the entrails thereof, while the crawfish and/or shrimp tail meat is disposed in eviscerating subsystem 500 based on input from vision subsystem 700. In some embodiments, control subsystem 600 may also be configured to determine whether the meat has been satisfactorily cleaned and/or eviscerated alone or based on input from vision subsystem 700.

Control subsystem 600 is configured to provide communication with, calculation for, and/or control of any one or more subsystems of system 1000 to provide functionality as described anywhere in this disclosure. While control subsystem 600 is shown and/or described herein, the present disclosure is not so limited and control subsystem 600 may include a plurality of separate, linked and/or interacting controller subsystems, each configured to control and/or command any one or more functionalities of system 1000 as described anywhere in this disclosure. Accordingly, control subsystem 600 may comprise one or more processors 611, memories 612 (including but not limited to transitory, computer-readable medium comprising code that, when executed by such a processor 611, may be configured to implement any function of any subsystem of system 1000 described in this disclosure, including but not limited to machine learning and/or application of artificial intelligence (AI)), communication inputs 613 (e.g., wired or wireless communication circuitry, audio inputs and/or circuitry, video inputs and/or circuitry, mouse or control pad inputs and/or circuitry, keyboard or button inputs and/or circuitry, memory storage inputs and/or circuitry, etc.), communication outputs 614 (e.g., wired and/or wireless electronic communication port(s) and/or circuitry, audio outputs and/or circuitry, display screen(s) or other video outputs and/or circuitry, haptic or vibrating outputs and/or circuitry, etc.), power sources 615, and/or any other circuitry and/or equipment 616 required or desired for affecting control of any subsystem shown and/or described in this disclosure. Accordingly, control subsystem 600 may comprise any suitable computing device, for example a laptop computer or a distributed computing device, such as a cloud computer.

Vision subsystem 700 is configured to receive and/or generate one or more images of each crawfish and/or shrimp at one or more important times or location points of the seafood processing process, for example, at the distal end of conveyor belt 104 of yaw-orienting subsystem 100, while the crawfish and/or shrimp is gripped by end effector 310 of seafood orienting subsystem 300, before, during or after clamping and/or twisting of the tail of the crawfish and/or shrimp by tail gripping and meat-separating subsystem 200, while the crawfish and/or shrimp is disposed on conveyor belt subsystem 400, and/or while the deshelled crawfish and/or shrimp tail meat is disposed on, within, or exited from eviscerating subsystem 500. In each (or any one or more) of these time points of the seafood processing process, such one or more images of the crawfish and/or shrimp (or portions thereof) may be utilized to determine an orientation and/or position of the crawfish and/or shrimp (or relevant portion thereof) as described anywhere in this disclosure. For example and not limitation, vision subsystem 700 may be configured to determine an axial orientation of each crawfish and/or shrimp, e.g., whether a particular crawfish and/or shrimp possesses a "belly down" axial orientation, before or while the crawfish and/or shrimp is gripped by end effector 310 of seafood orienting subsystem 300 based on one or more such images from a camera of vision subsystem 700. Vision subsystem 700 may be configured to determine, substantially in real-time, an axial orientation of each crawfish as tail gripping subsystem 200 rotates a tail gripper thereof to an appropriate orientation with respect to the axial orientation of the crawfish gripped by end effector 310 of seafood orienting subsystem 300 based on one or more such images from vision subsystem 700.

As with control subsystem 600, while one vision subsystem 700 is shown and/or described herein, the present disclosure is not so limited and vision subsystem 700 may include a plurality of separate, linked and/or interacting vision subsystems, each configured to perform and/or cause to be carried out any one or more functionalities related to visualization of, examination of, determination regarding, and/or manipulation of crawfish, shrimp or other seafood within system 1000 as described anywhere in this disclosure. Accordingly, vision subsystem 700 may comprise one or more processors 711, memories 712 (including but not limited to transitory, computer-readable medium comprising code that, when executed by such a processor 711, may be configured to implement any function described in connection with vision subsystem 700 anywhere in this disclosure, including but not limited to machine learning and/or application of artificial intelligence (AI)), communication inputs 713 (e.g., wired or wireless communication circuitry, audio inputs and/or circuitry, video inputs and/or circuitry, mouse or control pad inputs and/or circuitry, keyboard or button inputs and/or circuitry, memory storage inputs and/or circuitry, etc.), communication outputs 714 (e.g., wired and/or wireless electronic communication port(s) and/or circuitry, audio outputs and/or circuitry, display screen(s) or other video outputs and/or circuitry, haptic or vibrating outputs and/or circuitry, etc.), power sources 715, and/or any other circuitry and/or equipment 716 required or desired for affecting any vision subsystem 700 functionality shown and/or described in this disclosure. Accordingly, control subsystem 700 may comprise any suitable computing device, for example a laptop computer or a distributed computing device, such as a cloud computer.

Each of these subsystems will now be described in more detail in connection with one or more figures below.

Figure 2:
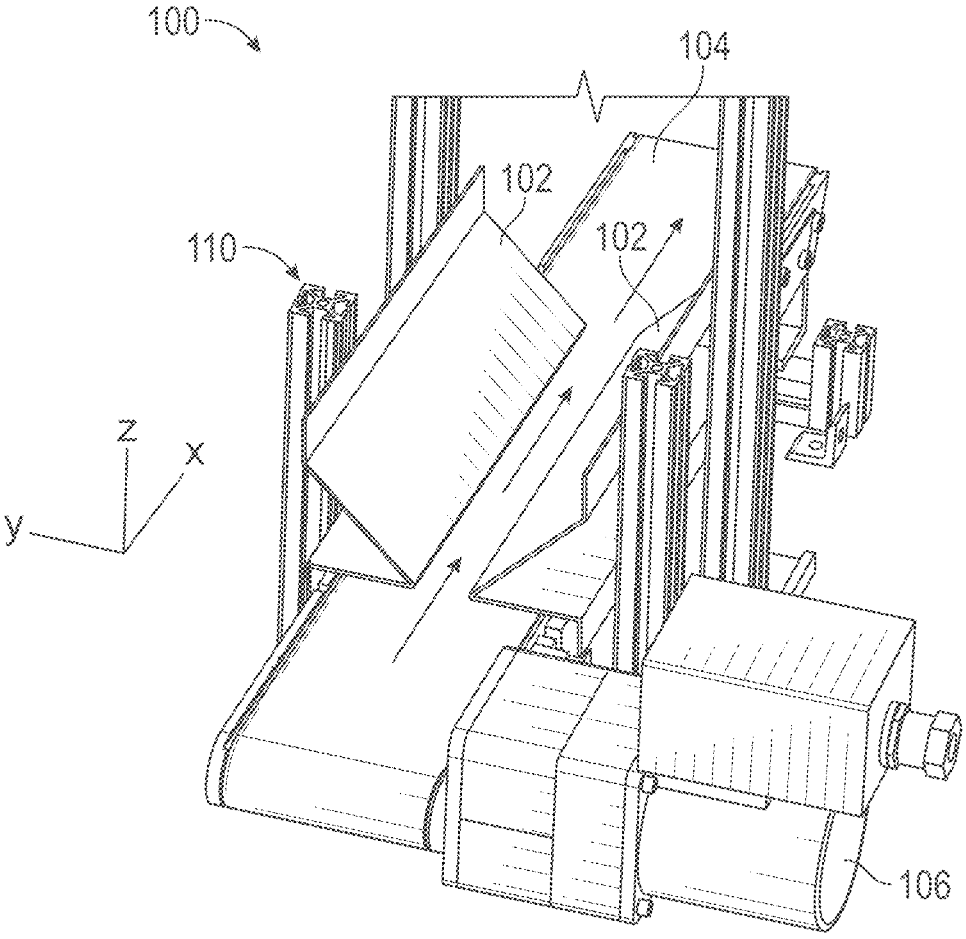
FIG. 2 is a perspective view of a yaw-orienting subsystem for the system of FIG. 1, according to some example embodiments.

FIG. 2 illustrates an example embodiment of yaw-orienting subsystem 100. Yaw-orienting subsystem 100 comprises a conveyor belt 104, which may be driven by a motor drive unit 106. In some embodiments, conveyor belt 104 comprises a Dorner conveyor belt (e.g., model number 2200 Low Profile Conveyor). However, the present disclosure is not so limited. In some embodiments, the conveyor belt itself may comprise plastic and/or an elastomer and, in some embodiments, may have a color (e.g., blue) deliberately chosen to contrast the typical colors of raw or boiled crawfish (e.g., red, tan and brown), thereby making visual identification and/or processing of images of the raw or boiled crawfish easier (e.g., less computationally intensive) for visual subsystem 700 and/or control subsystem 600. Yaw-orienting subsystem 100 comprises slanted sides 102, disposed over a proximal portion of conveyor belt 104, and a framework 110 configured to support slanted sides 102. In some embodiments, slanted sides 102 comprise sheet metal. However, the present disclosure is not so limited and may be constructed of any suitable material, e.g., plastic. In some embodiments, framework 110 comprises a T-slot frame. In some embodiments, portions of the T-slot frame (e.g., angle brackets) extend vertically behind multiple portions of slanted sides 102, thereby supporting slanted sides 102, vertically, from their backsides. In some embodiments, at least a portion of the T-slot frame extends horizontally along a top edge of slanted sides 102, thereby supporting slanted sides 102, horizontally, from their top edges.

In operation, crawfish and/or shrimp are dropped onto slanted sides 102, one or more at a time, as conveyor belt 104 is driven by motor drive unit 106 at a fixed, intermittent, variable or adjustable speed. As each crawfish and/or shrimp slides down slanted sides 102 and contact conveyor belt 104, the crawfish and/or shrimp is pulled by conveyor belt 104 and guided by slanted sides 102 such that the crawfish and/or shrimp is ultimately oriented in a predetermined direction, e.g., a substantially superior-inferior direction that is either head-first or tail-first on, and with respect to a direction of travel on, conveyor belt 104. While the embodiment shown, for example, in FIG. 2 illustrates such a predetermined direction to be substantially superior-inferior and head-first or tail-first, the present disclosure is not so limited and any other predetermined direction(s) or orientation(s) is/are also contemplated. In some embodiments, crawfish and/or shrimp are dropped onto conveyor belt 104 one or more at a time, for example at the operator's leisure, so no additional sensors or starting and/or stopping of conveyor belt 104 is required, which simplifies both manufacture and operation of system 1000. However, the present disclosure is not so limited and conveyor belt 104 may be actively controlled by control subsystem 600 to have variable speed as well as stopping and starting capabilities according to any requirement of any portion of system 1000. Subsystem 100 taking crawfish and/or shrimp in arbitrary, or random, orientations and providing them on conveyor belt 104 in the predetermined orientation(s), e.g., head-first or tail-first, greatly simplifies the requirements on vision system 700, control subsystem 600, and on subsequent subsystems of system 1000.

In some embodiments, slanted sides 102 are disposed at an approximately 45-degree angle with respect to a surface of conveyor belt 104. However, the present disclosure is not so limited and slanted sides 102 may be disposed at any angle steep enough to ensure that, when crawfish and/or shrimp are dropped one at a time onto slanted sides 102, the crawfish and/or shrimp slide down onto conveyor belt 104 under the force of gravity.

In operation, conveyor belt 104 presents a crawfish and/or shrimp in a substantially head-first or tail-first orientation at its distal end. This distal end of conveyor belt 104 may be considered a screening area for vision subsystem 700 to capture one or more images and/or videos of a crawfish and/or shrimp disposed on distal end of conveyor belt 104.

For example, as shown in at least FIGS. 1 and 10-13, vision system 700 may comprise a plurality of cameras 701, 702, 703, 704 or other suitable image or video capturing apparatuses capable of capturing 2-dimensional or 3-dimensional images utilizing any suitable wavelength of electromagnetic energy (e.g., visible light, infrared light, microwaves or radio waves) and/or any suitable frequency of sound (e.g., sonar).

In some embodiments, a first camera 701 is disposed directly over the distal end of conveyor belt 104 and configured to capture images of crawfish and/or shrimp disposed on the distal end of conveyor belt 104 from above. Accordingly, first camera 701 may be oriented perpendicularly to conveyor belt 104. In some embodiments, camera 701 is fixed to the framework of seafood orienting subsystem 300, in some embodiments approximately 11 inches above conveyor belt 104, although the present disclosure is not so limited.

In some embodiments, a second camera 702 is disposed directly across from subsystem 200 and configured to capture front and/or back images (e.g., images of the front or "face" of crawfish and/or shrimp or of the back or "tail-end" of the crawfish and/or shrimp while it is clamped by end effector 310 of seafood orienting subsystem 300. Accordingly, second camera 702 may be oriented perpendicularly to camera 701. Second camera 702 may also be oriented perpendicularly to horizontal rail 304 of seafood orienting subsystem 300. In some such embodiments, horizontal rail 304 of seafood orienting subsystem 300 is also disposed perpendicularly to the direction of travel of conveyor belt 104 of subsystem 100, thereby setting the degrees of movement freedom of subsystems 100 and 200 orthogonal to one another.

In some embodiments, a third camera 703 is disposed under the horizontal rail 304 of seafood orienting subsystem 300 and configured to capture images of crawfish and/or shrimp: (1) while disposed on the distal end of conveyor belt 104 before end effector 310 of seafood orienting subsystem 300, and/or (2) while clamped by end effector 310 of seafood orienting subsystem 300. Accordingly, third camera 703 may be oriented parallel to the horizontal rail 304 of seafood orienting subsystem 300, perpendicularly to camera 701, and/or perpendicularly to camera 702. Accordingly, third camera 703 may be configured to generate one or more images of the crawfish and/or shrimp as viewed from the side and/or as viewed from a top or bottom of the crawfish and/or shrimp.

In some embodiments, a fourth camera 704 is disposed within, or among components of, eviscerating subsystem 500 and configured to capture images of deshelled tail meat while disposed on the conveyor belt of conveyor belt subsystem 400, e.g., before, during and/or after a process for immobilizing the deshelled crawfish and/or shrimp tail meat for evisceration that utilizes immobilizing assembly 520 of eviscerating subsystem 500. Accordingly, fourth camera 704 may be oriented perpendicularly to the conveyor belt of conveyor belt subsystem 400. In some embodiments, such cameras 701-704 may be 2D Teledyne cameras (e.g., model number FLIR BFS-U3-16S2C-CS). However, the present disclosure is not so limited.

Returning to the discussion of the screening area at the distal end of conveyor belt 104, camera 701 and/or camera 703 may be utilized to capture one or more images and/or videos of a crawfish and/or shrimp disposed on distal end of conveyor belt 104. In some embodiments, conveyor belt 104 is configured to be controlled to stop briefly when each crawfish is initially disposed in the field of view of camera(s) 701 and/or 703. As will be described in more detail below, conveyor belt 104 may also be configured to move the crawfish and/or shrimp on the conveyor belt 104 to make minor adjustments in aligning the crawfish and/or shrimp with the end effector 310 of seafood orienting subsystem 300 based at least in part on one or more images of the crawfish and/or shrimp disposed on the distal end of conveyor belt 104. However, the present disclosure is not so limited and camera(s) 701 and/or 703 may be capable of taking unblurred images of each crawfish and/or shrimp while conveyor belt 104 is in constant motion, accelerating and/or decelerating within the operational range of speeds of conveyor belt 104.

For example, vision system 700 may be configured to analyze and/or process one or more images captured by one or more of camera(s) 701 and/or 703 and, thereby, determine if/when the crawfish and/or shrimp has entered or is at least partially present, or visible, within the one or more images captured by camera(s) 701 and/or 703 and, therefore, is disposed on the distal end of conveyor belt 104. In some embodiments, camera(s) 701-704 may be capable of taking images at a rate of at least 200 frames per second, although the present disclosure is not so limited.

Figure 22A:
FIG. 22A illustrates a head-on image of a crustacean generated by a camera of a vision subsystem for the system of FIG. 1, according to some example embodiments.
Figure 22B:
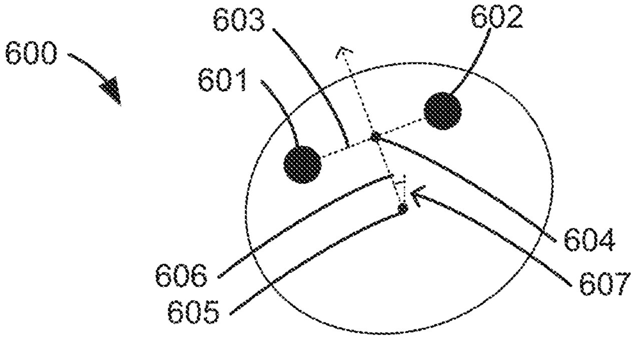
FIG. 22B illustrates an example head-on image of a crustacean utilized by the vision subsystem for the system of FIG. 1, according to some example embodiments.
Figure 22C:
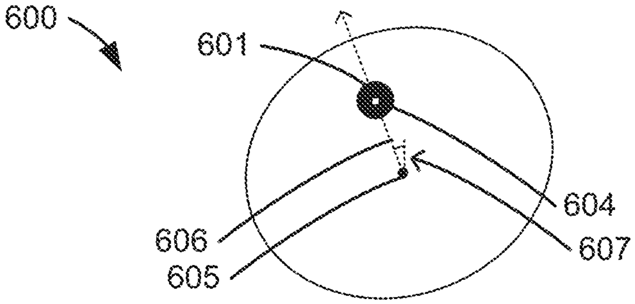
FIG. 22C illustrates an example head-on image of a crustacean utilized by the vision subsystem for the system of FIG. 1, according to some example embodiments.
Figure 23A:
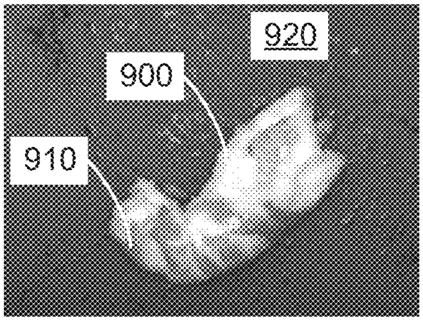
FIGS. 23A-26B illustrate images of crustacean and computer-generated classifications of portions of those images of crustacean, according to some example embodiments.
Figure 23B:
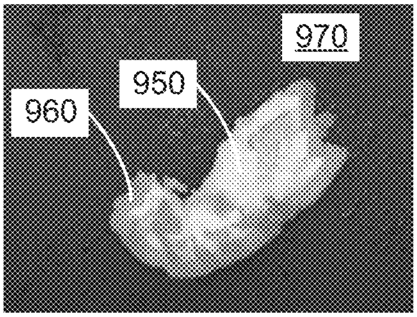
Figure 24A:
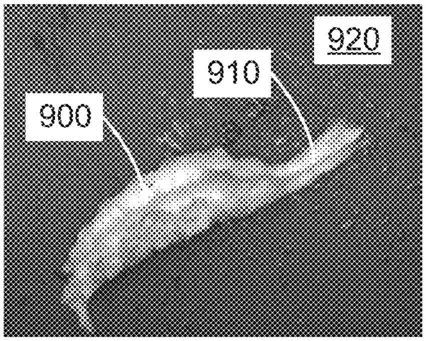
Figure 24B:
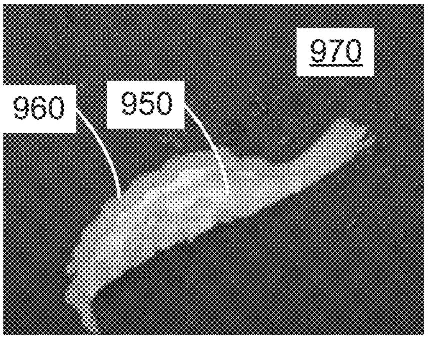
Figure 25A:
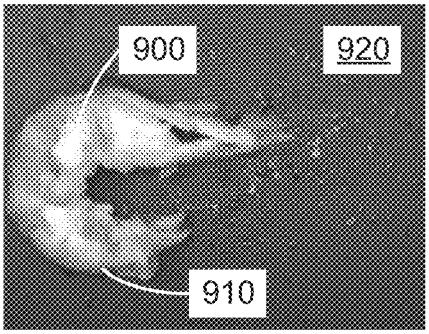
Figure 25B:
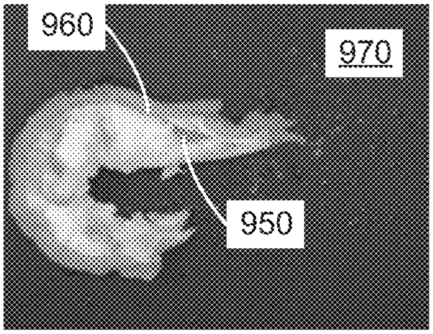
Figure 26A:
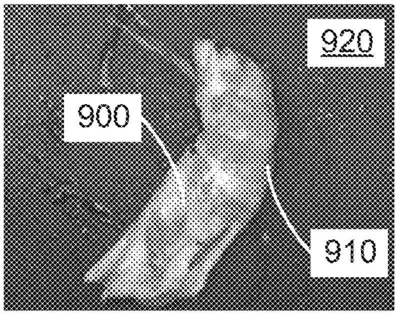
Figure 26B:
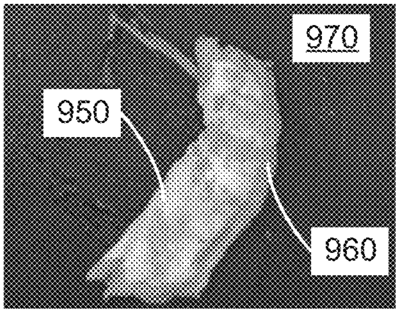

Vision subsystem 700 may also utilize an algorithm to determine an orientation of the crawfish and/or shrimp, e.g., whether it is facing head-first or tail-first and/or it's axial orientation, such as belly up, belly down, on a side or any orientation therebetween, on conveyor belt 104 or while being gripped by robotic gripping assembly 310. An example of such an algorithm may cause one or more of camera(s) 701, 702, 703, 704 to capture an image of the crawfish 600 and/or shrimp viewing substantially straight on the face of the crawfish and/or shrimp (see, e.g., FIGS. 22A-22C). This image may be utilized in determining an axial orientation of the crawfish and/or shrimp. For example, in some embodiments, vision subsystem 700 is configured to use a color threshold or color filtering algorithm to lock onto, filter, or otherwise select a particular colored shape of the crawfish (e.g., a red or reddish hue). In some embodiments, vision subsystem 700 is configured to use a color threshold or color filtering algorithm to lock onto, filter, or otherwise select a particular color of the eye(s) of the crawfish (e.g., black). In some embodiments, vision subsystem 700 is configured to disregard or delete detected features that do not have an expected size and/or shape of the crawfish eyes (e.g., relative size, roundness, and/or substantially circular form thereof). A result of such filtering may be the simplified illustrations shown in FIGS. 22B and/or 22C. Where a single eye is detected (e.g., FIG. 22C), a computer program flag may be set. Where both eyes are detected (e.g., FIG. 22B), a first line 603 extending through a center of both eyes may be programmatically determined and/or set to correspond to a transverse axis (e.g., separating the upper from the lower portion of the crawfish and/or shrimp). A line extending perpendicular to the first line and intersecting the first line at a midpoint between the first and second eyes may correspond to a sagittal axis (e.g., separating the left from the right portion of the crawfish and/or shrimp). Accordingly, vision subsystem 700 may determine a center position 605 of the blob 600 corresponding to the crawfish and/or shrimp body, e.g., the red-threshold. Where two eyes 601, 602 are identified, vision subsystem 700 may determine a center position 604 between the two eyes 601, 602. Subtracting the coordinate of center position 604 between the eyes and center position 605 of the crawfish outline or blob provides a vector 606 representing a direction pointing from the center to the top of the crawfish and/or shrimp. An angle 607 between the vertical and the vector 606 represents the angular deviation of the axial orientation of the crawfish and/or shrimp from a "belly-down" orientation. Angle 607 may be utilized in determining an amount of rotation to impart to subsystem 200 to properly align it with the gripped crawfish and/or shrimp as described anywhere in this disclosure. In some embodiments, if angle 607 is less than (or less than or equal to) a predetermined amount of error, the crawfish may be considered to be substantially in a "belly down" orientation. If angle 607 meets and/or exceeds such a threshold, vision subsystem 700 and/or control subsystem 600 may be configured to determine an amount of rotation necessary to properly align subsystem 200 with the gripped crawfish and/or shrimp as described anywhere in this disclosure.

Turning back to FIG. 22C and embodiments where only one eye 601 is detected in crawfish blob 600, vision subsystem 700 may determine a center position 604 of the eye 601. Subtracting the coordinate of center position 604 of eye 601 and center position 605 of the crawfish outline or blob provides a vector 606 representing a direction pointing from the center to the top of the crawfish and/or shrimp. Angle 607 between the vertical and vector 606 represents the angular deviation of the axial orientation of the crawfish and/or shrimp from a "belly-down" orientation. Angle 607 may be utilized in determining an amount of rotation to impart to subsystem 200 to properly align it with the gripped crawfish and/or shrimp as described anywhere in this disclosure. In some embodiments, if angle 607 is less than (or less than or equal to) a predetermined amount of error, the crawfish may be considered to be substantially in a "belly down" orientation. If angle 607 meets and/or exceeds such a threshold, vision subsystem 700 and/or control subsystem 600 may be configured to determine an amount of rotation necessary to properly align subsystem 200 with the gripped crawfish and/or shrimp as described anywhere in this disclosure.

In some embodiments, such an algorithm is capable of determining this orientation by analyzing a limited number of individual image frames, for example less than 12 frames, less than 6 frames, less than 3 frames, or even just a single frame. In some embodiments, such an algorithm may employ any suitable control, learning and/or storing algorithm(s) including but not limited to artificial intelligence (AI), machine learning and/or blockchain to improve and/or achieve threshold identification of any parameter or aspect of a crawfish and/or shrimp as described herein.

In some embodiments, axial orientation and/or rotation angle(s) of the crustacean are calculated using machine learning, for example, by training a dynamic neural network using a large image dataset of crustaceans that are captured with one or more of cameras 701, 702, 703, 704. In some embodiments, a human operator may manually measure an orientation of the crustacean in each image, then save that orientation in a training database. For each image in such a database, a computer may use machine vision techniques to extract one or more numerical parameters. Such parameters, along with such manually measured orientations, may be used to train such a neural network.

Such parameters used for determining an orientation of the crustacean, for example, on conveyor belt 104 may include but are not limited to a size and centroid location of a silhouette of the crustacean. Such a silhouette may be measured by using a color threshold technique to lock-on to the typical reddish-orange color of the crustacean (e.g., crawfish). Parameters may further include a size and centroid location of the convex hull of the crustacean (e.g., crawfish) silhouette, and/or an angular direction from the centroid location of the silhouette and the convex hull of the silhouette.

Figure 21A:
FIG. 21A illustrates a side image of a crustacean generated by a camera of a vision subsystem for the system of FIG. 1, according to some example embodiments.
Figure 21B:
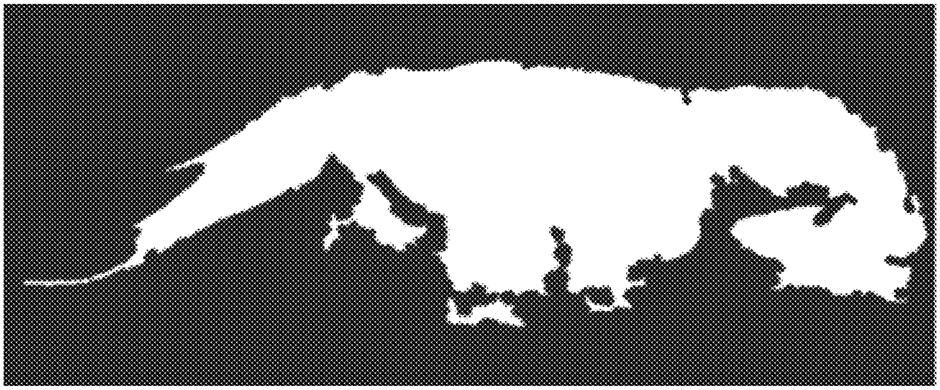
FIG. 21B illustrates a modified side image, e.g., silhouette, of the crustacean of FIG. 21A, according to some example embodiments.
Figure 21C:
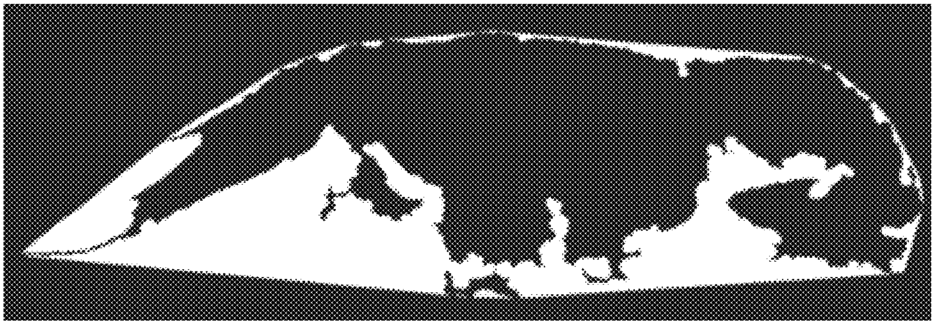
FIG. 21C illustrates another modified side image of a crustacean utilized by the vision subsystem for the system of FIG. 1, for example as a negative of the image of FIG. 21B, according to some example embodiments.

Such parameters used for determining an orientation of the crustacean, for example, while the head is being gripped by robotic gripper assembly 310 may include but are not limited to a number and position of eyes that are detected in the face-on image. The number and position of eyes may be measured using a color threshold technique that is tuned for the dark black or white color of crawfish eyes. After that, a binary particle filter technique may be utilized to isolate only the small features that are very round in shape. Parameters may further include a centroid of the silhouette of the crawfish in front facing images (see, e.g., FIGS. 22A-22C), an angular direction of the crawfish eyes in the front facing image compared to the centroid of the silhouette, an apparent curvature of the crawfish as measured from a side camera from the top down, a size and centroid location of the crawfish silhouette in the side images (see, e.g., FIGS. 21B and/or 21C). Such size and centroid location(s) may be measured by using a color threshold technique to lock-on to the typical reddish-orange color of a crawfish. Parameters may further include a size and centroid location of the convex hull of the crawfish silhouette in the side images (see, e.g., FIGS. 21A-21C), an angular direction from the centroid location of the crawfish silhouette and the convex hull of the silhouette in the side camera images (see, e.g., FIGS. 21A-21C), and/or a percentage of crawfish pixels that fall within the red, yellow/white, and dark black color bandwidths in the side camera image (see, e.g., FIGS. 21A-21C).

In some embodiments, any such algorithms may be configured at least in part to generate and/or train on data from a plurality of images of each of a plurality of crawfish and/or shrimp taken at a plurality of angles with respect to the X, Y and Z axes. For example, each of a predetermined number of crawfish and/or shrimp (e.g., 300-1000) may be imaged at each of a plurality of angles (e.g., 1 degree delta between images) that span the entire 360 degrees with respect to each of the X, Y and Z axes. Such training images may be taken of crawfish and/or shrimp while lying along on a surface (e.g., conveyor belt 104) or while being gripped, e.g., by robotic gripping assembly 310 or tail removing subsystem 200. Utilizing each of these images, or code developed, determined and/or written based on analysis thereon, vision subsystem 700 may be configured to compare images of each crawfish and/or shrimp within system 1000 with a plurality of the above-described training images and determine an orientation of the specific crawfish and/or shrimp being processed based on a closest match with one of the training images. However, the present disclosure is not so limited and any other suitable matching and/or scoring method(s) may be employed in any of the algorithms or processes described in this disclosure.

In some embodiments, lighting (not shown, but, e.g., LED lighting) may be employed along portions of system 1000 to ensure sufficiently consistent lighting for accurate operation of vision subsystem 700. In some embodiments, vision subsystem 700 is configured to send information regarding this determination to control subsystem 600, and/or to seafood orienting subsystem 300 directly, for orienting and/or moving the crawfish utilizing seafood orienting subsystem 300 as will be described in more detail below.

Once the crawfish and/or shrimp orientation on conveyor belt 104 has been determined and/or calculated, such a determination may be utilized by control subsystem 600, and/or by seafood orienting subsystem 300 directly, to control seafood orienting subsystem 300 to properly grab the head of the crawfish regardless of the size of the crawfish or its relative position on conveyor belt 104 and provide physical transferal of the crawfish and/or shrimp from conveyor belt 104 and yaw-orienting subsystem 100 to tail-removing and meat-separating subsystem 200.

FIGS. 3-7 illustrate several features of seafood orienting subsystem 300, though the present disclosure is not so limited and any suitable type of robotic gripper and/or movement may be utilized, for example SCARA, delta, or articulating robots, single or multiple rigid or flexible grippers for external gripping, piercing probes, vacuum/pressure or any combination thereof. Additionally, while the present disclosure utilizes separate yaw-orienting subsystem 100 and seafood orienting subsystem 300, the present disclosure is not so limited and also, or alternatively, contemplates utilizing one or more conveyor belts integrated with mechanical grippers, for example, as provided by Powertech Machinery co., Ltd., to ultimately orient the crawfish in desired or predetermined orientation(s).

Figure 3:
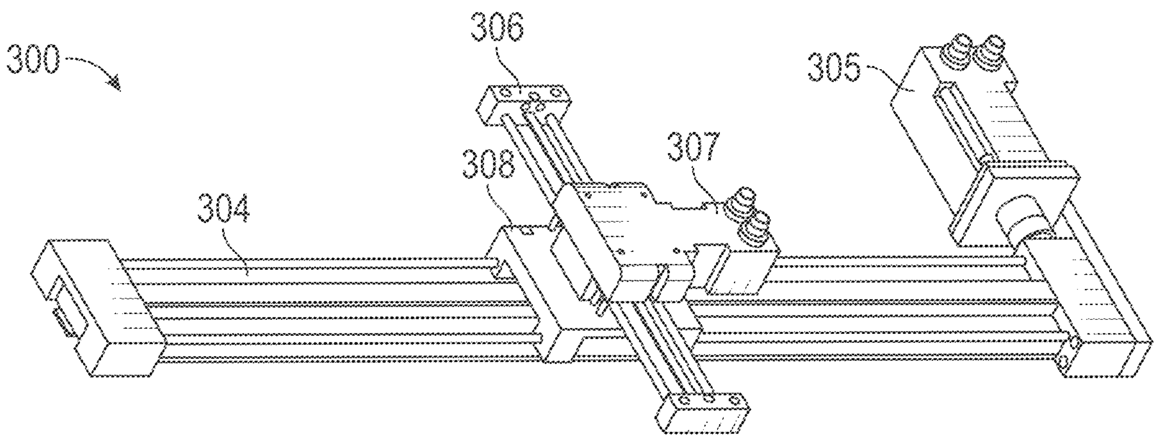
FIG. 3 is a perspective view of a seafood orienting subsystem for the system of FIG. 1, according to some example embodiments.
Figure 10:
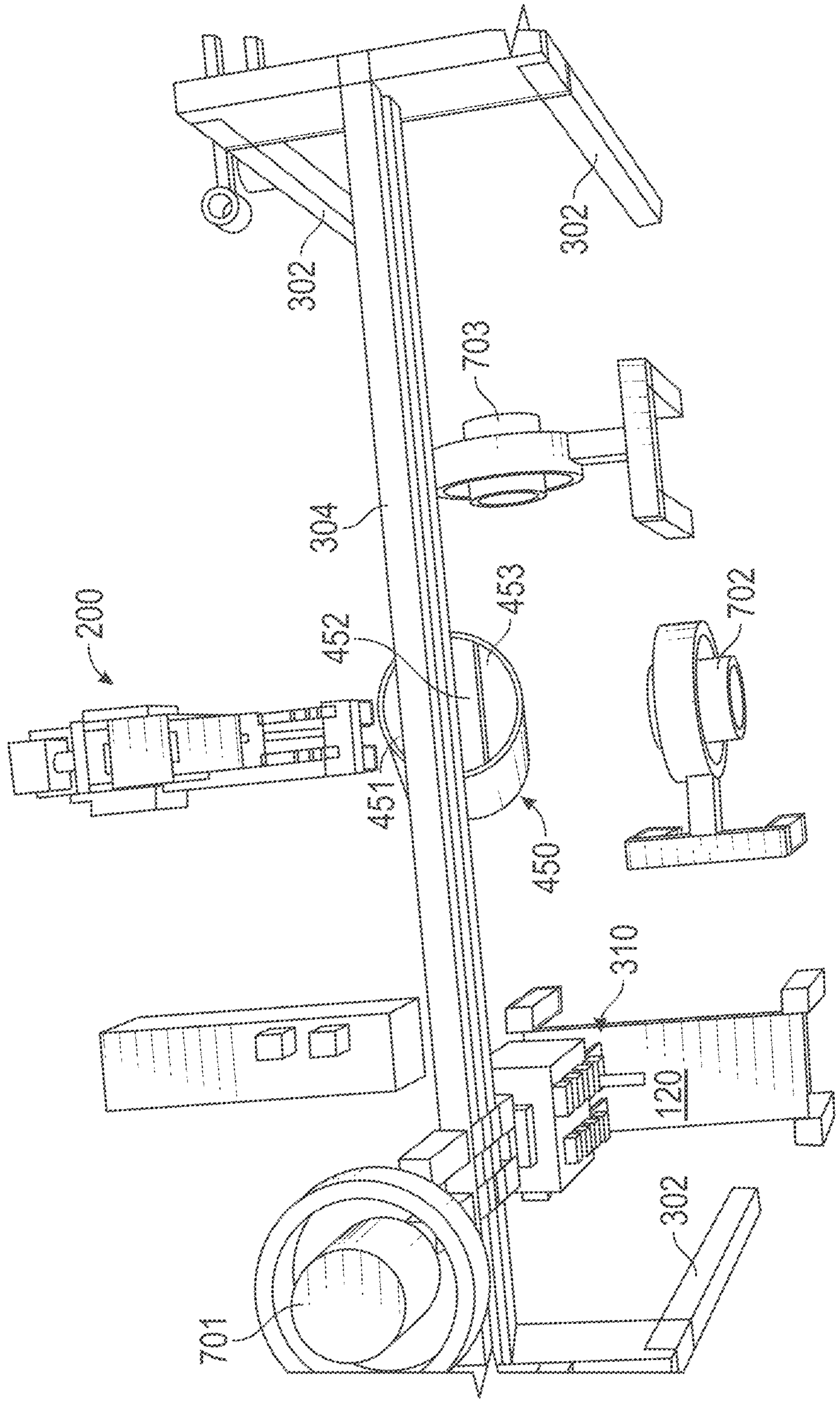
FIG. 10-13 each illustrates a different view of the plurality of cameras of a vision subsystem for the system of FIG. 1, according to some example embodiments.
Figure 11:
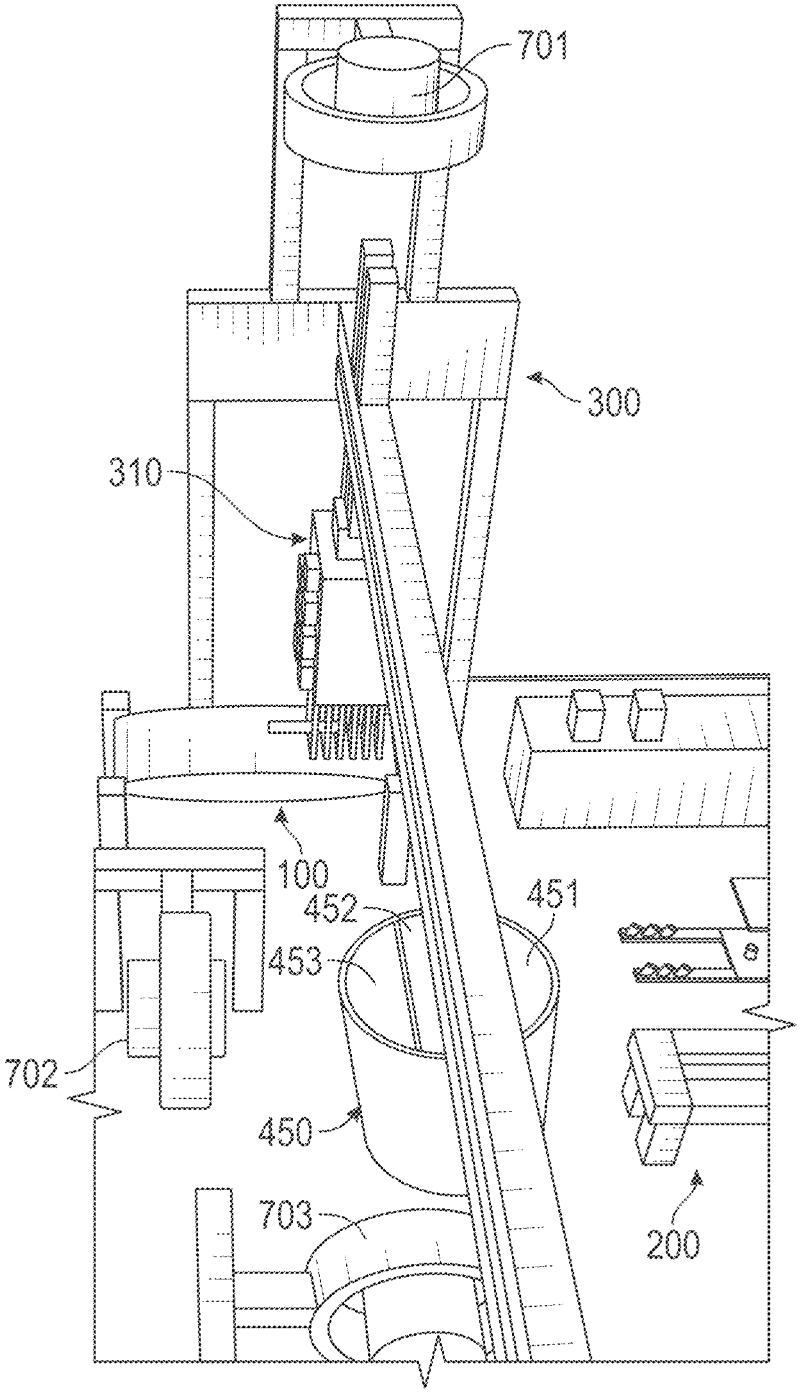
Figure 12:
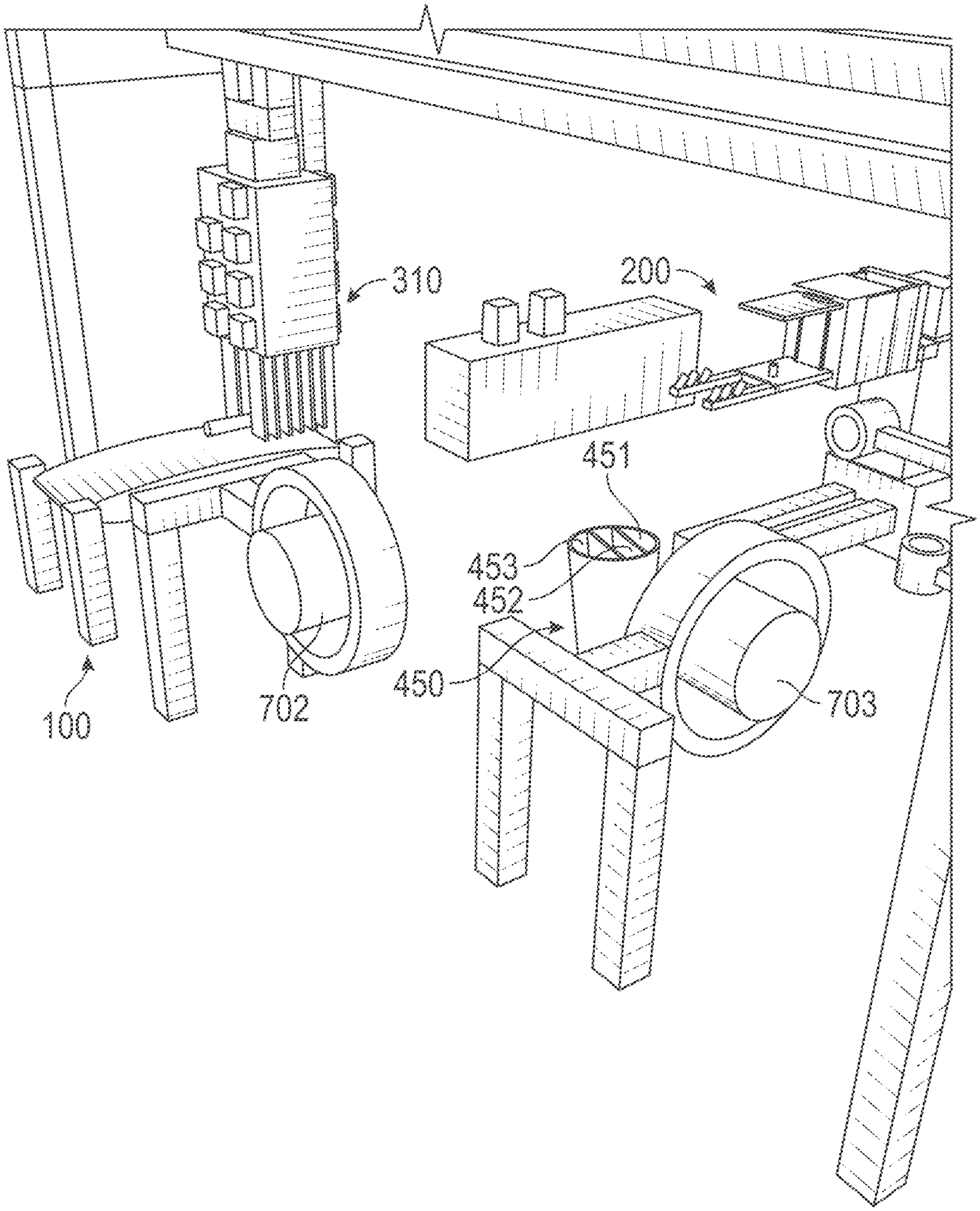
Figure 13:
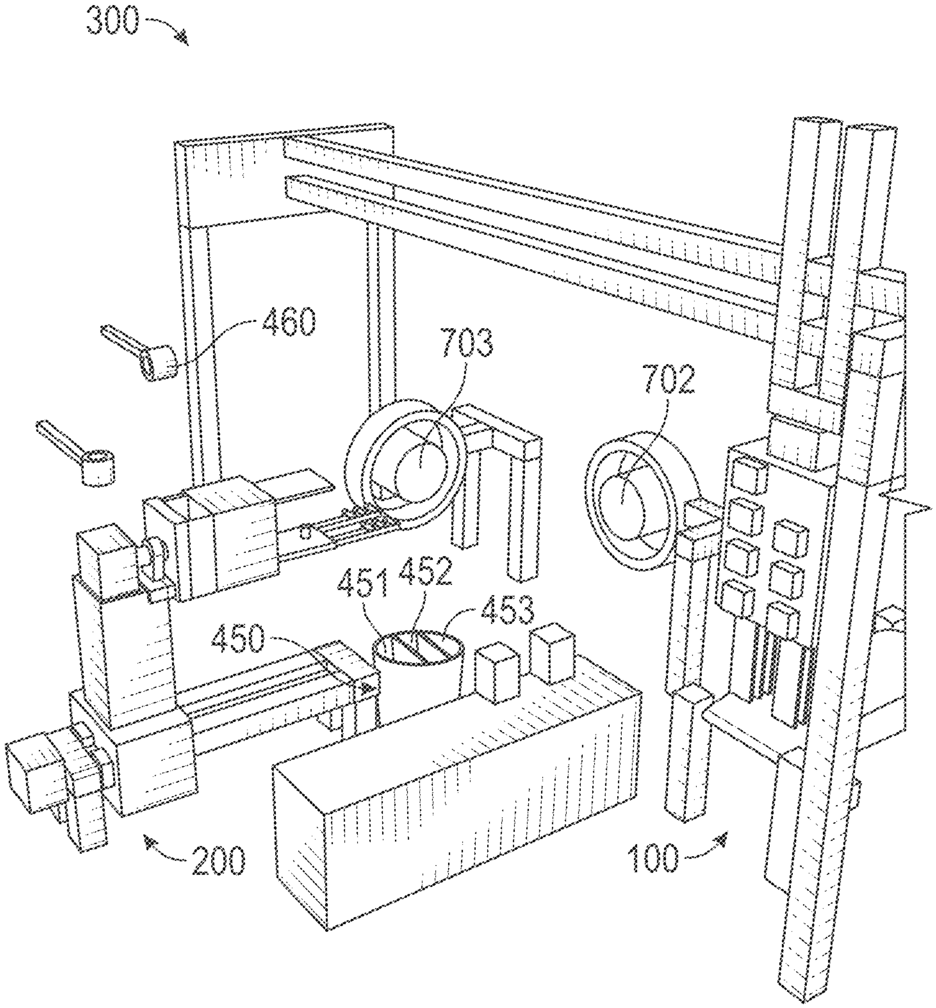

Turning to subsystem 300, seafood orienting subsystem 300 may comprise uprights 302 (see, e.g., FIGS. 6 and 10), which in some embodiments, may be disposed substantially vertically. Seafood orienting subsystem 300 comprises at least one horizontal rail 304 spanning uprights 302. FIG. 3 illustrates an embodiment comprising a single horizontal rail 304, while, e.g., FIGS. 6 and 10 illustrate an embodiments comprising two, parallel horizontal rails 304. Seafood orienting subsystem 300 comprises at least one vertical rail 306 configured to be adjustably translated vertically with respect to horizontal rail(s) 304. FIG. 3 illustrates an embodiment comprising a single vertical rail 306, while FIGS. 4-6 and 10 illustrate embodiments with two, parallel vertical rails 306. Seafood orienting subsystem 300 comprises a carriage 308 configured to adjustably translate or articulate horizontally, along horizontal rail(s) 304. In some such embodiments, vertical rail(s) 306 is/are configured to translate vertically through, and/or on, carriage 308. And carriage 308 is configured to translate horizontally on vertical rail(s) 304. In some embodiments vertical rail(s) 306 comprise a rotatable coupler 316 configured to couple an end effector 310.

Seafood orienting subsystem 300 comprises at least one motor 305, 307. In some embodiments, a motor 305 is configured to drive movement of carriage 308 along horizontal rail(s) 304 and another motor 307 is configured to drive movement of vertical rail 306 with respect to horizontal rail(s) 304 and/or carriage 308, with or without the aid of belts, bands, and/or gearing. Accordingly, control subsystem 600, and/or seafood orienting subsystem 300 itself, may be configured to send control signals, with or with out input from vision system 700, for precisely driving motor(s) 305, 307 to position an end effector 310 of seafood orienting subsystem 300 as described anywhere in this disclosure. In some embodiments, gantry system 300 comprises an IGUS gantry robot (e.g., model number DLE-LG-0002. However, the present disclosure is not so limited.

Figure 4:
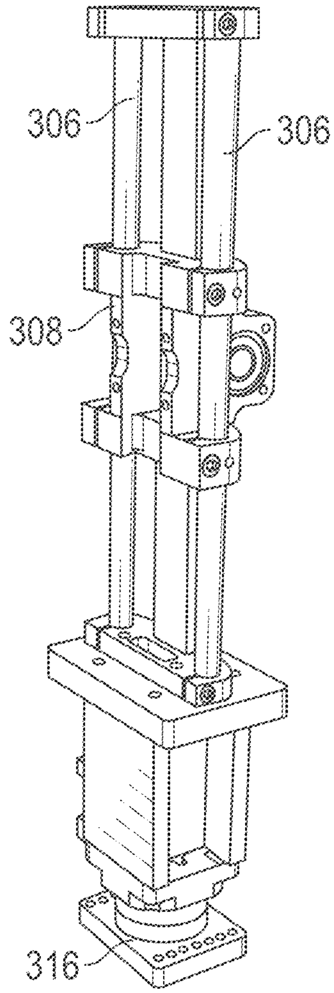
FIG. 4 is a top perspective view of a portion of the seafood orienting subsystem of FIG. 3, according to some example embodiments.
Figure 5:
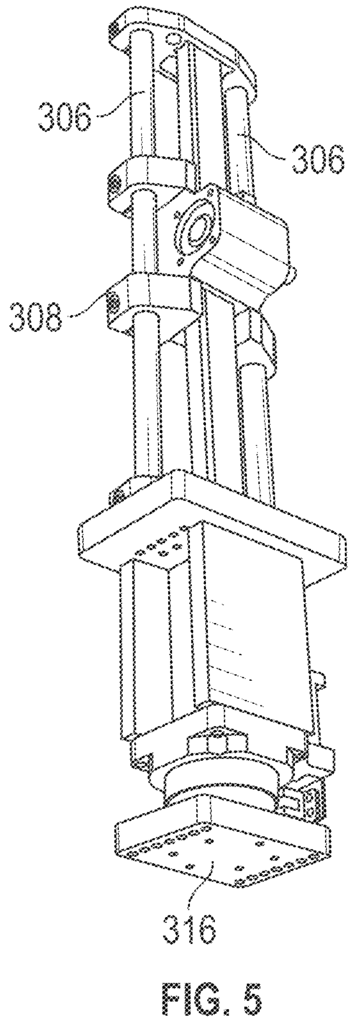
FIG. 5 is a bottom perspective view of a portion of the seafood orienting subsystem of FIG. 3, according to some example embodiments.
Figure 6:
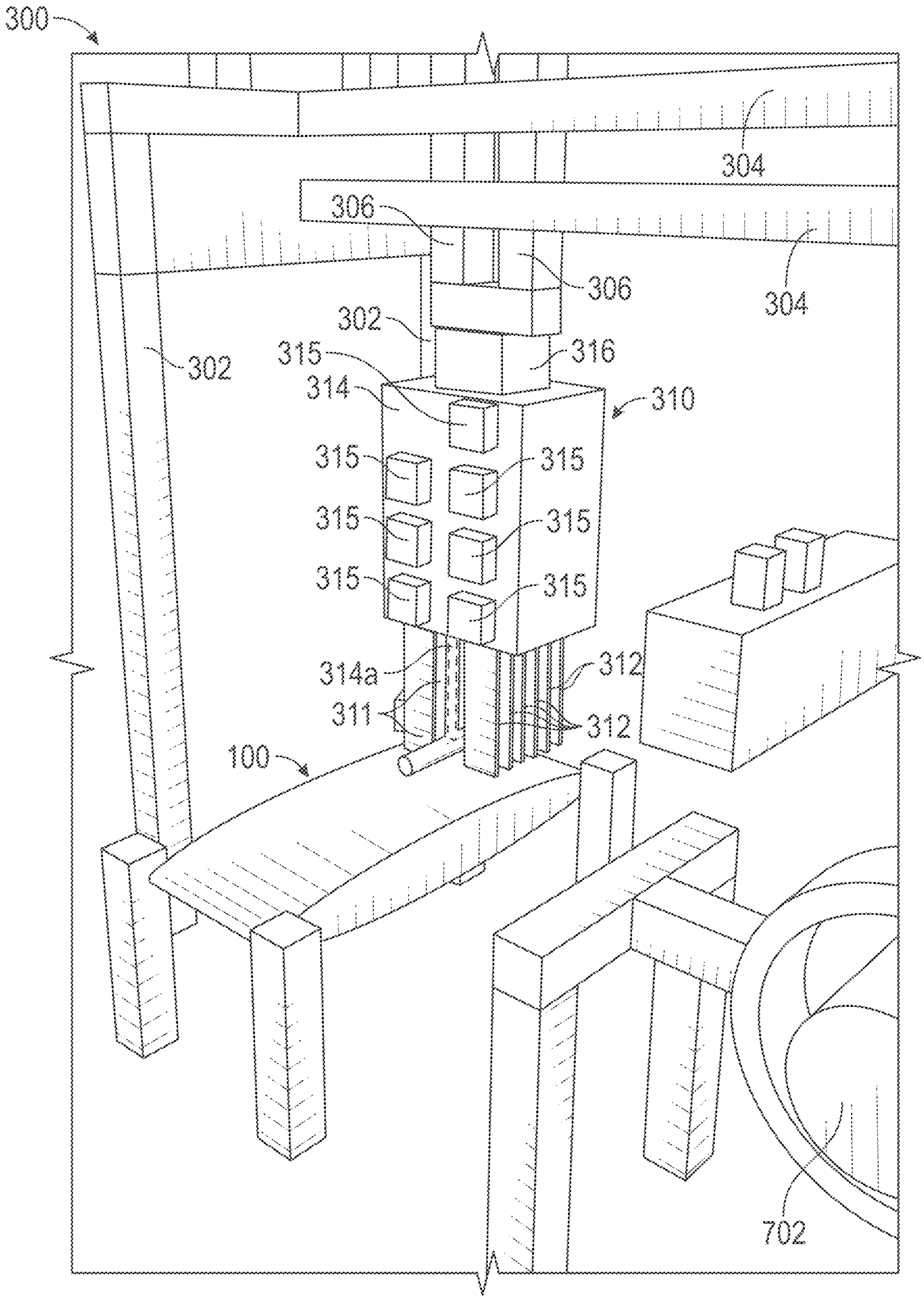
FIG. 6 is a perspective view of an end effector of the seafood orienting subsystem of FIGS. 3-5 comprising a multi-pronged rigid gripper, according to some example embodiments.

Seafood orienting subsystem 300 comprises an end effector 310 coupled to vertical rail 306 (e.g., via rotatable coupling 316 as shown in FIGS. 4-5). Such an end effector 310 comprises a robotic gripper assembly that is configured to rotate about at least one axis (e.g., a vertical axis about a rotatable coupling 316) and align the gripper assembly with the crawfish and/or shrimp. Robotic gripper assembly 310 is also configured to appropriately grip the crawfish and/or shrimp as described anywhere in this description. A first example of such a gripper assembly 310 is illustrated in at least FIG. 6, while another example of such a gripper assembly 310 is illustrated in at least FIG. 7.

As illustrated in FIGS. 6, robotic gripper assembly 310 comprises a base 314 coupled to vertical rail(s) 306 via rotatable coupling 316. In some embodiments, rotatable coupling 316 is driven by an internal motor, e.g., an electric motor, so as to rotate robotic gripper assembly 310 about the vertical axis to align the gripper assembly 310 with the crawfish and/or shrimp as disposed on the distal end of conveyor belt 104 and/or to align the gripper assembly 310 and/or the gripped crawfish and/or shrimp with tail removing subsystem 200 as described anywhere in this disclosure. Accordingly, control subsystem 600, and/or seafood orienting subsystem 300 itself, may be configured to send control signals for precisely driving the motor of rotatable coupling 316 as described anywhere in this disclosure.

As further illustrated in FIG. 6, robotic gripper assembly 310 comprises a plurality (e.g., 2, 3, 4, 5, 6, 7 or any other suitable number) of pairs of rigid, semi-rigid or flexible gripping fingers, comprising a first plurality of rigid, semi-rigid or flexible fingers 311 laterally spaced from one another and a second plurality of rigid, semi-rigid or flexible fingers 312, also laterally spaced from one another, disposed opposite the first plurality of rigid fingers 311. In some embodiments, each pair of opposing first and second rigid fingers 311, 312 are configured to be individually driven or "pinched" by a respective electric motor 315 (or other driving force such as hydraulics and/or pneumatics). Accordingly, one or more pairs of first and second rigid fingers 311, 312 may be individually "pinched," for example where first and second rigid fingers 311, 312 will, or are determined to, grip the crawfish and/or shrimp, and individually "opened," for example where first and second rigid fingers 311, 312 will not, or are determined not to, grip the crawfish and/or shrimp. For example, in some embodiments, fingers 311, 312 should not be closed where such closing would interfere with uncurling the tail of the crawfish and/or shrimp. Control subsystem 600, and/or seafood orienting subsystem 300 itself, may be configured to send control signals for precisely driving the motors 315 for closing first and second fingers 311,312 an appropriate amount for gripping, but not crushing, a crawfish and/or shrimp as described anywhere in this disclosure.

In some embodiments, a bottom surface of base 314 may comprise a protrusion **314*a* configured to press against the head (e.g., the carapace) of the crustacean disposed on conveyor belt 104 to, thereby, pin the crustacean against conveyor belt 104 prior to (and/or during or after) the processes of closing fingers 311, 312 to grip the crustacean by the head. Such a structure and function may prevent the crustacean from moving substantially as fingers 311, 312** close. In some embodiments, such a protrusion 314*a* may comprise a suction or vacuum nozzle or other feature configured to contact the head of the crustacean and to be activated, thereby, assisting in holding the head of the crustacean stationary with respect to the robotic gripping assembly 310 for any interval of time from gripping of the crustacean through disposal of the separated head in waste container 450.

In some embodiments, pressure sensors (not shown) may be disposed on surfaces of base 314 (e.g., a vertical pressure sensor) and/or one or more of first and/or second fingers 311, 312 and/or torque sensors (not shown) may be coupled to first and/or second fingers 311, 312 or to the motor shaft(s) driving fingers 311, 312 and may be configured to send signals indicative of an amount of subjected torque or pressure against the crawfish and/or shrimp, for example, to control subsystem 600 for use in determining an appropriate amount to open and/or close fingers 311,312 as well as in determining appropriate relative positioning of fingers 311, 312 with respect to the head or the crawfish and/or shrimp when gripping and/or releasing a crawfish and/or shrimp as described anywhere in this disclosure.

In some embodiments, each of fingers 311 has a thickness of approximately 2 mm and an on-center spacing between adjacent fingers of approximately 10-12 mm. Fingers 312 may have a substantially identical arrangement. Such arrangements provide sufficient open space between fingers to allow imaging of the crawfish and/or shrimp while gripped thereby. However, the present disclosure is not so limited and any other suitable thickness and/or on-center spacing is also contemplated.

In some embodiments, each of the second plurality of rigid fingers 312 is directly aligned opposite a respective one of the first plurality of rigid fingers 311. In some embodiments, each of the second plurality of rigid fingers 312 is aligned with a slight lateral offset from a respective one of the first plurality of rigid fingers 311 (e.g., similar to a scissor where such lateral offset substantially aligns lateral surfaces of opposing first and second rigid fingers along a same plane, and similar to interlaced fingers where such a lateral offset aligns first rigid fingers opposite further into the spacing between neighboring second rigid fingers and second rigid fingers further into the spacing between neighboring second rigid fingers).

Figure 7:
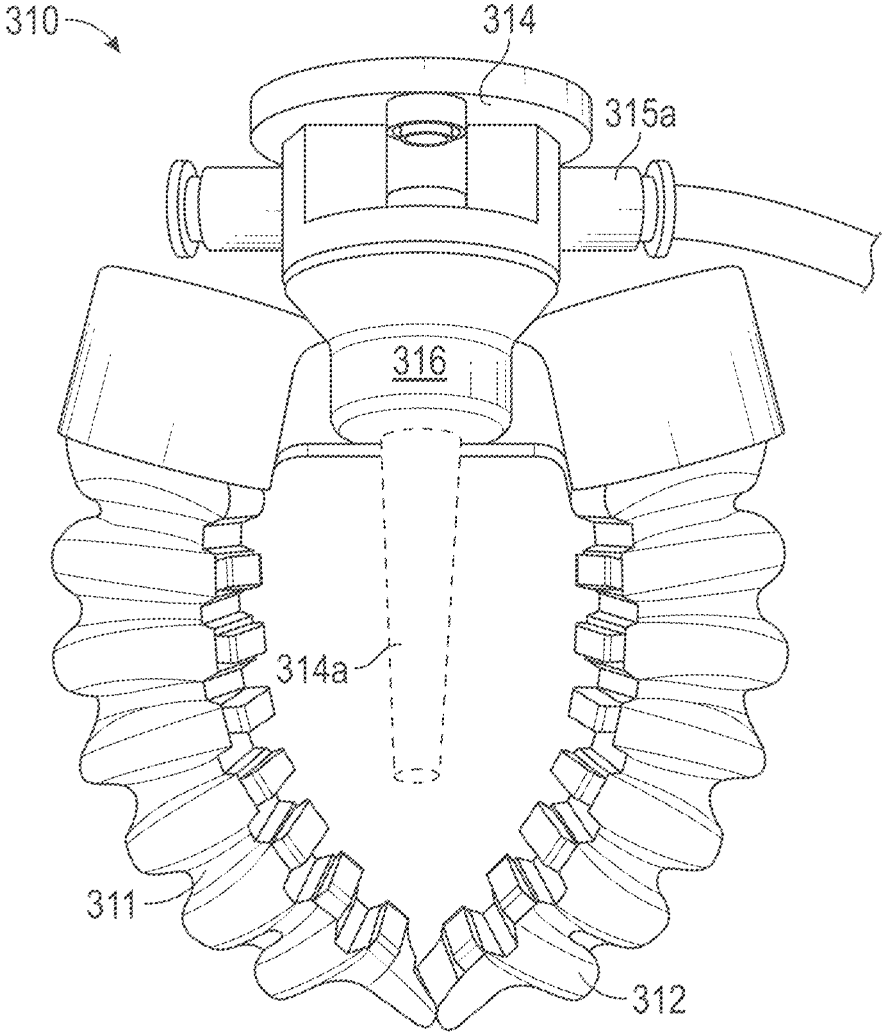
FIG. 7 is a side view of another end effector of the seafood orienting subsystem of FIGS. 3-5 comprising a flexible gripper, according to some example embodiments.

Turning to the embodiments of robotic gripper assembly 310 illustrated in FIGS. 7, robotic gripper assembly 310 may comprise a base 314 and a rotatable coupling 316. A first gripper finger 311 and a second gripper finger 312 are each pivotally coupled to diametrically opposite portions of rotatable coupling 316 such that first and second gripper fingers 311, 312 face one another. In some embodiments, first and second gripper fingers 311, 312 comprise silicone or any other suitably soft and/or pliable or elastomeric material. However, the present disclosure is not so limited and any type of gripper configured to provide enough friction, or in some embodiments enough suction provided by one or more vacuum holes disposed on one or more of fingers, with the crawfish to thereby pick up and/or hold it in place, for example, hard, rigid and/or pointy, or piercing gripping technologies, are also contemplated. While two fingers 311, 312 are shown, the present disclosure is not so limited and such a robotic gripper may have any number of gripper fingers. Moreover, the present disclosure is not limited to a robotic gripper, but also contemplates any other suitable grabbing or securing means, including but not limited to a suction, friction creating and/or other type of end effector.

Robotic gripper assembly 310 of FIG. 7 comprises a pneumatic coupling 315*a* configured to receive a pressurized fluid. In some embodiments, application of such pressurized fluid to pneumatic coupling 315*a* may cause rotation of rotatable coupling 316 with respect to base 314. In some embodiments, application of such pressurized fluid to pneumatic coupling 315*a* (or to another similar coupling of gripper assembly 310) may cause first and second gripper fingers 311, 312 to move toward one another (e.g., at least respective distal tips of first and second gripper fingers 311, 312). However, the present disclosure is not so limited and rotation of rotatable coupling 316 with respect to base 314 and/or of movement of first and/or second gripper fingers 311, 312 may be accomplished by any suitable method (e.g., under power of one or more electric motors).

In some embodiments, pressure sensors (not shown) may be disposed on surfaces of first and/or second fingers 311, 312 or torque sensors (not shown) may be coupled to first and/or second fingers 311, 312 or to the motor shaft(s) driving fingers 311, 312 and may be configured to send signals indicative of an amount of subjected torque or pressure against the crawfish and/or shrimp to, for example, control subsystem 600 for use in determining an appropriate amount to move fingers 311,312 when gripping and/or releasing a crawfish and/or shrimp as described anywhere in this disclosure.

In operation, seafood orienting subsystem 300 is configured to move the crawfish from yaw-orienting subsystem 100 to tail-removing and meat-separating subsystem 200 and to provide any desired degree of rotation of the crawfish needed to properly orient the crawfish to a desired orientation, e.g., a tail-first orientation or tail-end toward subsystem 200.

For example, as previously described, vision subsystem 700 is configured to determine a relative orientation of the crawfish and/or shrimp based at least in part on one or more images of the crawfish and/or shrimp, generated by a camera of vision subsystem 700 (e.g., 701 and/or 703 where the crawfish and/or shrimp is disposed on the distal end of conveyor belt 104; 702 and/or 703 where the crawfish and/or shrimp is being gripped and/or moved by gripper assembly 310 before, during or after movement of the crawfish and/or shrimp to the tail-removing and meat-separating subsystem 200). While cameras are illustrated as being in-line with or above the subsystems and above the crustacean, the present disclosure is not so limited and cameras may also, or alternatively, be disposed underneath any one or more of the subsystems and/or conveyor belts for utilization within and/or by vision subsystem 700 to accomplish any function described anywhere herein.

Vision subsystem 700 is also configured to determine the location of the crawfish on conveyor belt 104 of yaw-orienting subsystem 100 based on such images. Vision system 700 makes, and then sends the relative orientation assessment, which may comprise head-first or tail-first determination, an axial-orientation of the belly, a location on the conveyor, and/or identification of the head section (cephalothorax) and tail section (abdomen) or an indication corresponding thereto, to control subsystem 600. Control subsystem 600 is configured to pass coordinates corresponding to the location of the crawfish on conveyor belt 104 to seafood orienting subsystem 300 for aligning robotic gripper 310, and the relative orientation assessment (e.g., head-first or tail-first axial-orientation of the belly, location on the conveyor), or indication thereof, to seafood orienting subsystem 300 for application of any desired degree of rotation of crawfish needed to properly orient the crawfish during the move from conveyor belt 104 of yaw-orienting subsystem 100 to tail-removing and meat-separating subsystem 200.

Seafood orienting subsystem 300 is configured to move carriage 308 along horizontal rail 304 to a position corresponding with the coordinates received from control subsystem 600 such that robotic gripper 310 is disposed above the head (cephalothorax) of the crawfish. In some embodiments, since seafood orienting subsystem 300 is disposed at a right angle (90 degrees) with respect to conveyor belt 104, an additional degree of freedom and/or control in aligning robotic gripper assembly 310 is realized at least in that control subsystem 600 may be configured to incrementally move conveyor belt 104 while the crawfish and/or shrimp is disposed at the distal end to, thereby facilitate this alignment between robotic gripper assembly 310 and the crawfish and/or shrimp. Then, seafood orienting subsystem 300 may be configured to move robotic gripper assembly 310, on vertical rail 306, in a substantially vertical (z) direction toward the crawfish until the head of the crawfish is disposed between first and second grippers 311, 312 (see, e.g., robotic gripper assembly 310 of FIG. 7) or first and second plurality of grippers 311, 312 (see, e.g., robotic gripper assembly 310 of FIG. 6) (e.g., half an inch above conveyor belt 104). While example distances are given, the present disclosure is not so limited and seafood orienting subsystem 300 may be configured to move robotic gripper assembly 310 a distance in the (z) direction that is based at least in part on a determination of the size of the crawfish, for example determined by vision subsystem 700. Under control from control subsystem 600 and/or seafood orienting subsystem 300 itself, robotic gripper assembly 310 may be rotated to a desired orientation with respect to the crawfish and/or shrimp and first and second grippers 311, 312 (or determined respective pairs of plurality of grippers 311, 312) may be clamped against the head (cephalothorax) of the crawfish or immediately distally adjacent thereto. This position of the crawfish comprises a hard, consistently flat shell, which is most suitable for achieving a firm grip on the crawfish. Then, seafood orienting subsystem 300 may be configured to move robotic gripper assembly 310, on vertical rail 306, in the vertical (z) direction away from conveyor belt 104 in order to line up the crawfish tail, in the vertical (Z) direction, with tail removing and meat separating subsystem 200. Then seafood orienting subsystem 300 is configured to move carriage 308 along horizontal rail 304 to a position where robotic gripper assembly 310 is disposed directly in front of, and aligned in the horizontal direction with, tail-removing and meat-separating subsystem 200. Seafood orienting subsystem 300 is also configured to move carriage 308 along horizontal rail 304 to a position where robotic gripper assembly 310 is also aligned with and in the visual field of camera(s) 702, 703 while robotic gripper assembly 310 is aligned with subsystem 200.

Control subsystem 600 and/or vision subsystem 700 may be configured to determine another set of coordinates corresponding to this position based at least in part on the size of the crawfish and/or shrimp, based at least in part on if the crawfish and/or shrimp shifted while being moved from subsystem 100 and into a visual field of camera(s) 702 and/or 703 for alignment with subsystem 200, and/or based at least in part on any irregularities or deformations of the crawfish and/or shrimp identified by vision subsystem 700 from images captured, e.g., by camera(s) 701 and/or 703 during or prior to robotic gripper assembly 310 gripping the crawfish and/or shrimp, thereby ensuring the crawfish is properly positioned with respect to tail-removing and meat-separating subsystem 200 for most effective tail (e.g., abdomen) uncurling and separation from the head section (e.g., carapace) regardless of the crawfish's size. For example and not limitation, if the crawfish was determined to have a tail-first orientation, no rotation is carried out by seafood orienting subsystem 300, while if the crawfish was determined to have a head-first orientation, seafood orienting subsystem 300 is configured to cause rotatable coupling 316 to rotate base 314 180 degrees to flip the crawfish to the desired tail-first, or tail-away orientation.

In some embodiments, vision subsystem 700 may be configured to capture one or more images of the crawfish and/or shrimp while gripped by robotic gripping assembly 310, for example using camera 703 (see, FIG. 1), and determine whether any of gripper fingers 311, 312 are clamped against the tail portion of the crawfish and/or shrimp and/or determine whether the tail portion of the crawfish and/or shrimp is not being uncurled as expected as will be described below. In the event one or more of the plurality of gripper fingers 311, 312 are determined to be clamped against the tail portion of the crawfish (rather than the head portion), vision subsystem 700 may send an indicative signal to control subsystem 600, and control subsystem 600 may send control signal(s) to seafood orienting subsystem 300 to open those fingers 311, 312, and in some embodiments to move the offending fingers 311, 312 and/or robotic gripper assembly 310, so as to avoid interference with operation of tail-removing and meat-separating subsystem 200, as will be described below.

In some embodiments, vision subsystem 700 may be configured to capture one or more images of the crawfish and/or shrimp while gripped by robotic gripping assembly 310, for example using camera(s) 702 and/or 703 (see, FIG. 1), and determine a thickness of the crawfish and/or shrimp. For example, vertical rail 306 may be articulated such that the crawfish and/or shrimp is disposed at one or more vertical dispositions within the visual field of camera(s) 702 and/or 703 and the images captured may be utilized by vision system 700 to determine a thickness of one or more portions of the crawfish and/or shrimp. Such determinations may be utilized by control subsystem 600 in determining an amount to open and/or close fingers 311, 312 of robotic gripper assembly 310 and, in some embodiments, to determine if robotic gripper assembly 310 and/or subsystem 200 are to be repositioned for proper alignment with one another.

Several embodiments of tail-removing and meat-separating subsystem 200 are contemplated. For example, FIGS. 8 and 9 illustrate a first embodiment of subsystem 200, with FIGS. 10-13 illustrating different views of system 1000 including such an embodiment of subsystem 200, while FIGS. 14A-14E illustrate a second embodiment of subsystem 200 which may equally be employed with system 1000 in direct replacement for subsystem 200 shown in FIGS. 10-13.

Figure 8:
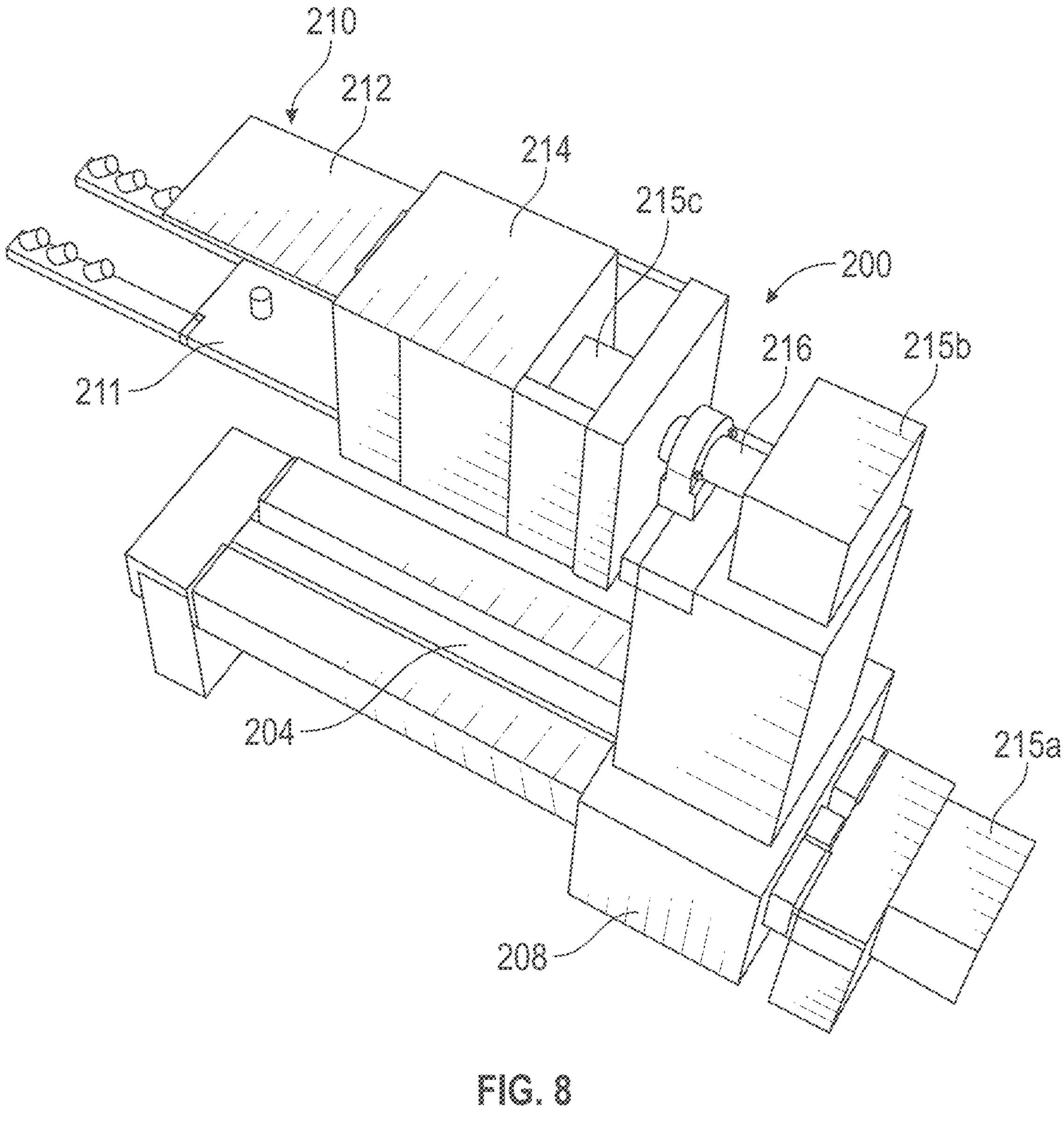
FIG. 8 illustrates a perspective view of a tail gripper subsystem for the system of FIG. 1, according to some example embodiments.
Figure 9:
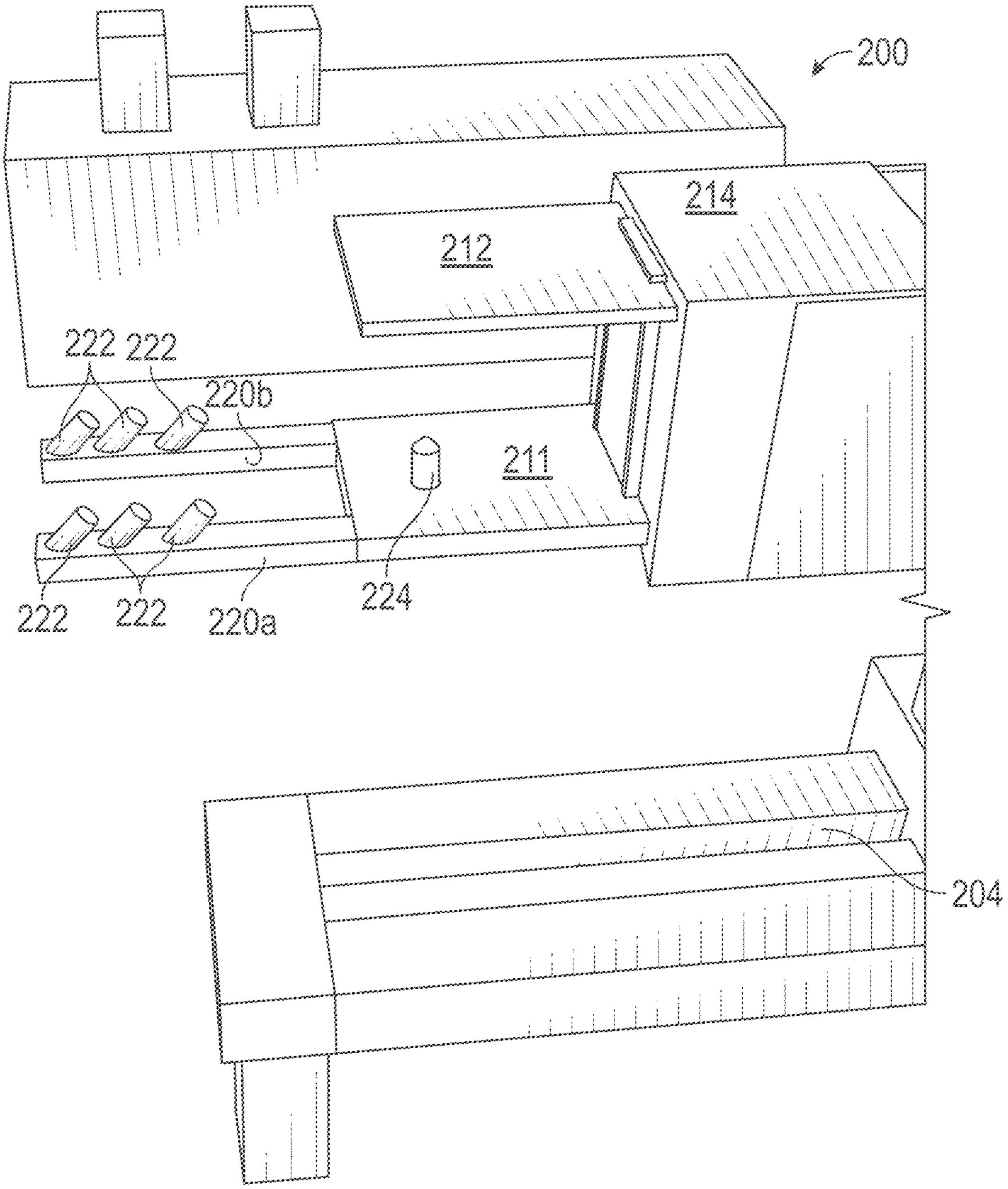
FIG. 9 illustrates another perspective view of the tail gripper subsystem of FIG. 8.

According to some embodiments as illustrated in FIGS. 8 and 9, tail-removing and meat-separating subsystem 200 comprises a horizontal rail 204 or similar structure. At least a portion of a carriage 208 is disposed on and/or within horizontal rail 204 such that carriage 208 is configured to translate horizontally along the longitudinal direction of horizontal rail 204 when driven by a motor 215*a* (e.g., an electric motor).

Tail-removing and meat-separating subsystem 200 further comprises a base 214 coupled to carriage 208 via an adjustably rotatable coupling 216 such that base 214 is configured to rotate, axially, about an axis of rotation of rotatable coupling 216 when driven by a motor 215*b* (e.g., an electric motor). In some embodiments, the axis of rotation of rotatable coupling 216 is horizontal, parallel to the longitudinal direction of horizontal rail 204, and/or perpendicular to the direction of extension of horizontal rail(s) 304 of seafood orienting subsystem 300.

Tail-removing and meat-separating subsystem 200 further comprises a first gripping paddle 211 and a second gripping paddle 212. First and second gripping paddles 211, 212 are configured to cooperate with one another to uncurl and then grip the tail of the crawfish and/or shrimp while the robotic gripper assembly 310 of seafood orienting subsystem 300 is gripping the head of the crawfish and/or shrimp. In some embodiments, first and second gripping paddles 211, 212 are substantially flat. First and second gripping paddles 211, 212 may have a significantly greater width compared to gripper fingers 311, 312 of robotic gripper assembly 310 so as to provide larger mating or gripping surfaces for immobilizing the uncurled tail of the crawfish and/or shrimp. In some embodiments, both first and second gripping paddles 211, 212 are configured to move toward one another when driven by a motor 215*c*. In some embodiments, one of first and second gripping paddles 211, 212 is fixed or stationary with respect to base 214 while the other of first and second gripping paddles 211, 212 is configured to move toward and close the distance between first and second gripping paddles 211, 212. In some but not all such embodiments, first paddle 211, which may further comprise pneumatic components, may be fixed or stationary so as to reduce movement of supplying hoses, etc.

In some embodiments, pressure sensors (not shown) may be disposed on surfaces of first and/or second paddles 211, 212 or torque sensors (not shown) may be coupled to first and/or second paddles 211, 212 or to the motor shaft(s) driving paddles 211, 212 and may be configured to send signals indicative of an amount of subjected pressure or torque against the tail of the crawfish and/or shrimp to, for example, control subsystem 600 for use in determining an appropriate amount to move paddles 211,212 when gripping and/or releasing a crawfish and/or shrimp tail as described anywhere in this disclosure.

As best shown in FIG. 9, first gripping paddle 211 may comprise a pair of blower rails 220*a*, 220*b* each extending from a front edge of first gripping paddle 211. For example, blower rail 220*a* is illustrated as being disposed maximally to one lateral side of the front edge of first gripping paddle 211, while blower rail 220*b* is illustrated as being disposed maximally to the opposite lateral side of the front edge of the first gripping paddle 211. Each of blower rails 220*a*, 220*b* comprises at least one, and in some embodiments a plurality, of air blower nozzles 222, each configured to blow a burst or stream of compressed air at an angle against the belly of the curled tail of the crawfish and/or shrimp to, thereby straighten the tail in preparation for first and second gripping paddles 211, 212 to close together and grip the uncurled tail on both sides, e.g., paddle 212 closing on a dorsal side of the crawfish and/or shrimp and paddle 211 closing on a ventral side of the crawfish and/or shrimp. Accordingly, blower nozzles 222 may be disposed at an angle on blower rails 220*a*, 220*b* of, e.g., 45 degrees from the horizontal. In some embodiments, blower nozzles 222 on one or both of blower rails 220*a*, 220*b* may be turned or angled inward toward a centerline of first paddle 211 (e.g., angled inward toward the opposite blower rail 220*b*, 220*a*) so as to direct the compressed air of each rail away from the rail and in a direction tilted toward the centerline of first paddle 211 or toward the other rail to, thereby, improve effectiveness of the tail-uncurling function. In some embodiments, each of blower nozzles 222 may be fed by a hollow air transporting system integrated into the structure of at least first gripping paddle 211 and/or blower rails 220*a*, 220*b*. First gripping paddle 211 further comprises an injector nozzle 224 disposed proximal of the blower nozzles 222 and of blower rails 220*a*, 220*b*. When first and second gripping paddles 211, 212 are closed and the tail is gripped, injector nozzle 224 is configured to pierce the belly of the crawfish and/or shrimp and inject the tail (e.g., abdomen) with air to, thereby, eject the tail meat from the shell.

However, the present disclosure is not so limited and any number of blower rails, blower nozzles and/or blower ducts are contemplated. For example and not limitation, paddle 211 may comprise a single blower rail 220 disposed to extend from a middle or center of the front edge of paddle 211. Such a single blower rail 220 may have form and function similar to or identical to the blower rail(s) 220*a*, 220*b* except that the blower nozzles and/or duct may or may not be angled to a side substantially toward a midline of paddle 221, since the blower nozzles and/or duct would already be so-aligned, extending from the middle or center of the front edge of paddle 211.

According to some other embodiments as illustrated in FIGS. 14A-14E, tail-removing and meat-separating subsystem 200 comprises a horizontal rail 204 or similar structure. At least a portion of a carriage 208 is disposed on and/or within horizontal rail 204 such that carriage 208 is configured to translate horizontally along the longitudinal direction of horizontal rail 204 when driven by a motor (e.g., an electric motor not shown but either located within and/or on carriage 208 or within and/or on horizontal rail 204).

Tail-removing and meat-separating subsystem 200 further comprises a base 214 configured to rotate, axially, about an axis of rotation of rotatable coupling 216 when driven by a motor (e.g., an electric motor not shown but located within carriage 208 or within and/or on base 214). In some embodiments, the axis of rotation of rotatable coupling 216 is horizontal, parallel to the longitudinal direction of horizontal rail 204, and/or perpendicular to the direction of extension of horizontal rail(s) 304 of seafood orienting subsystem 300.

Tail-removing and meat-separating subsystem 200 further comprises a first gripping paddle 211 and a second gripping paddle 212. First and second gripping paddles 211,212 are configured to cooperate with one another to uncurl and then grip the tail of the crawfish and/or shrimp while the robotic gripper assembly 310 of seafood orienting subsystem 300 is gripping the head of the crawfish and/or shrimp. In some embodiments, first and second gripping paddles 211, 212 are substantially flat. First and second gripping paddles 211, 212 may have a significantly greater width compared to gripper fingers 311, 312 of robotic gripper assembly 310 so as to provide larger mating or gripping surfaces for immobilizing the uncurled tail of the crawfish and/or shrimp. In embodiments shown in FIGS. 14A-14E, both first and second gripping paddles 211, 212 can be configured to translate independently of each other on respective threaded rods 217*a*, 217*b* and move toward or away from one another when driven by respective motors 215*c*, 215*d*, which may be disposed at respective ends of threaded rods 217*a*, 217*b*.

Figure 14A:
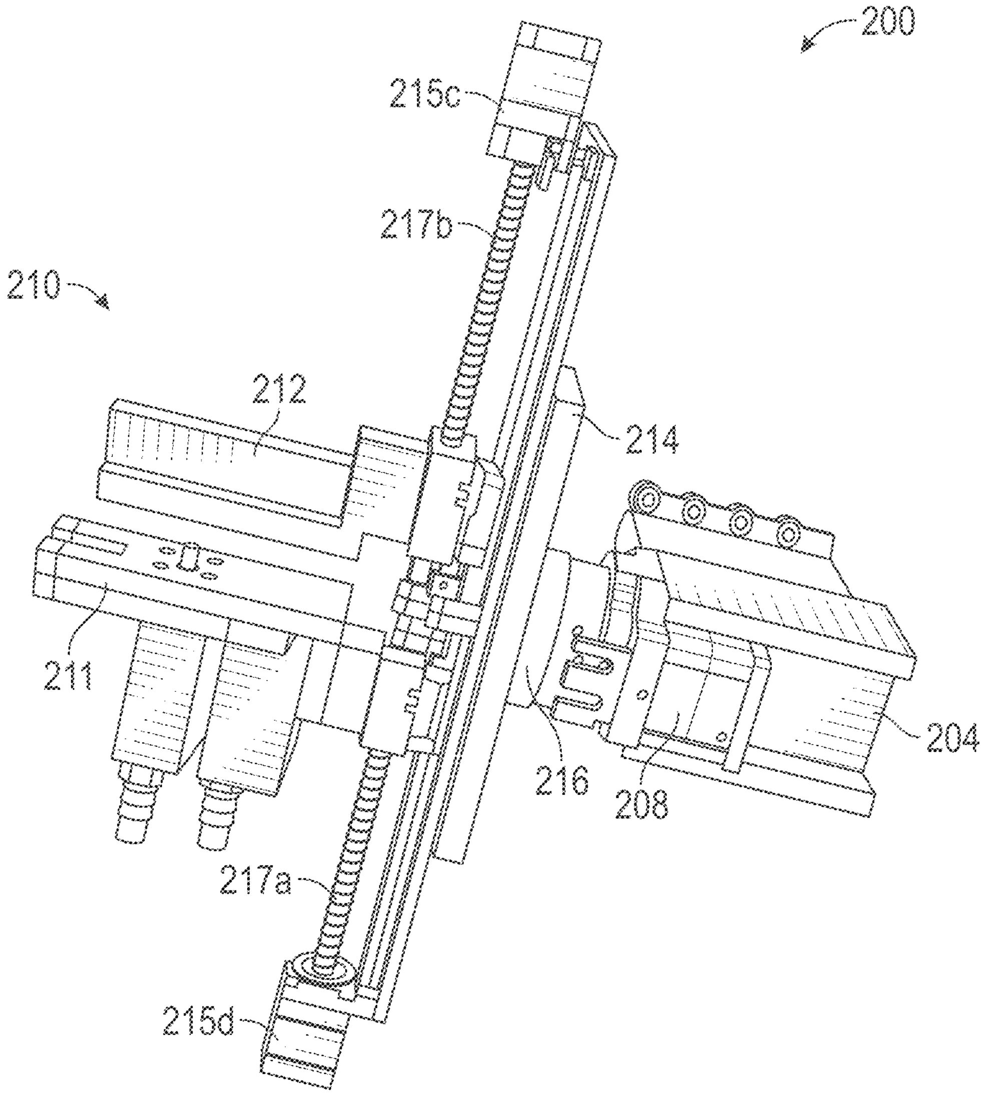
FIGS. 14A-14E each illustrate a different perspective view of another tail gripper subsystem for the system of FIG. 1, according to some example embodiments.
Figure 14B:
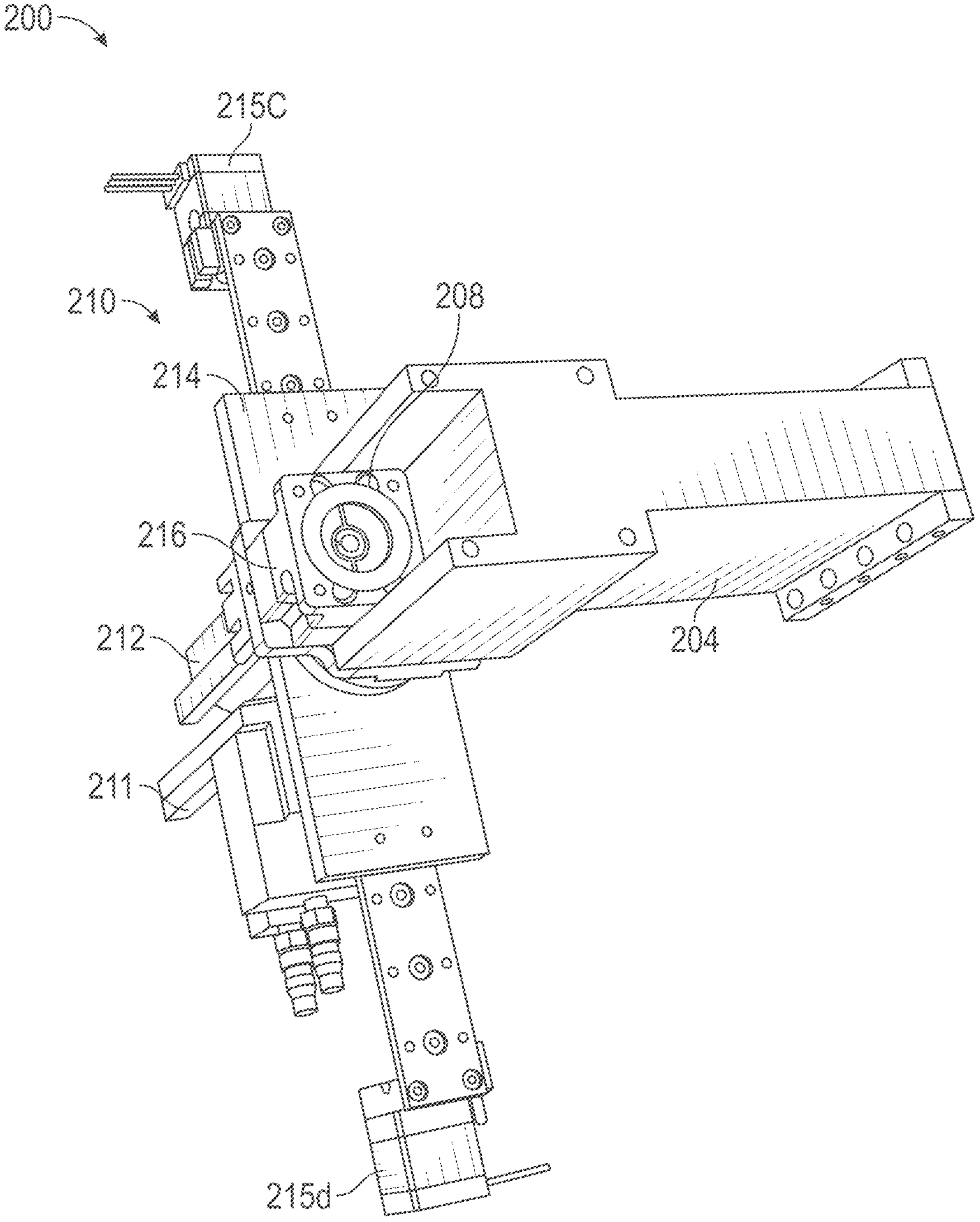
Figure 14C:
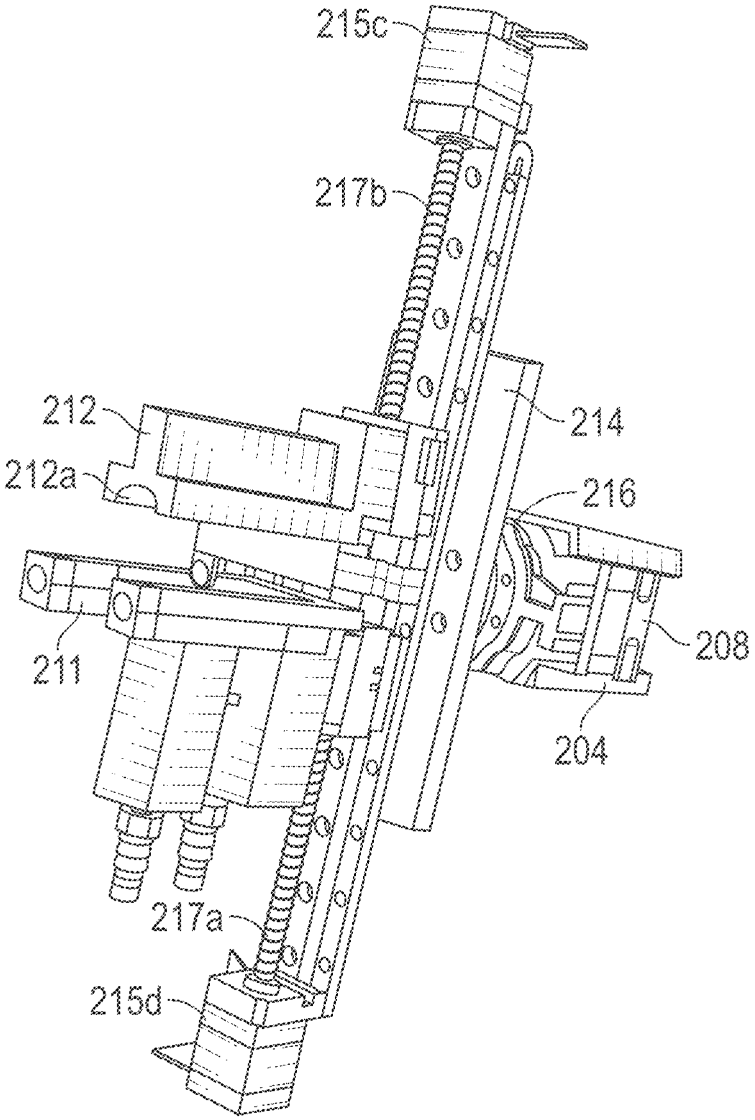
Figure 14D:
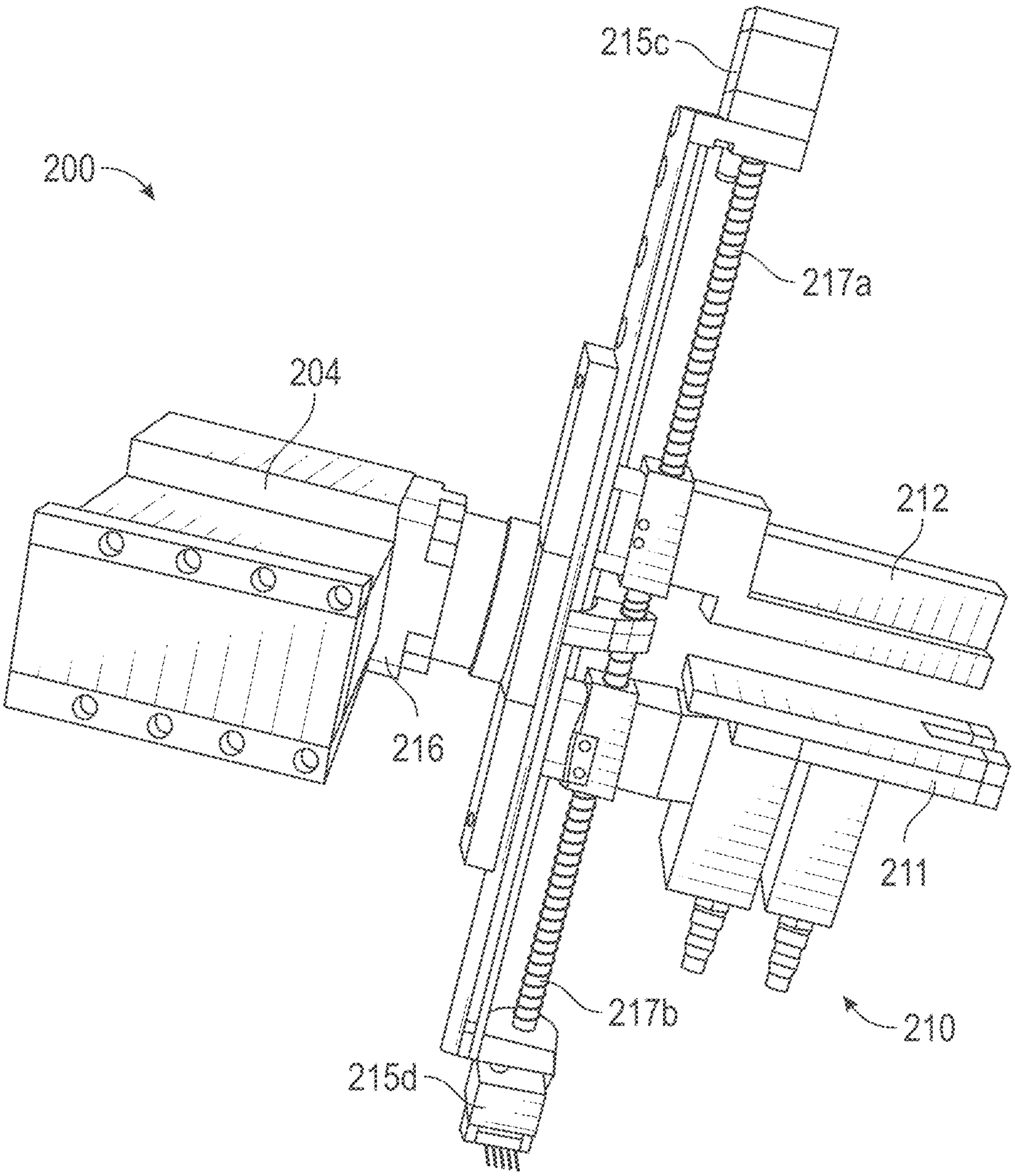
Figure 14E:
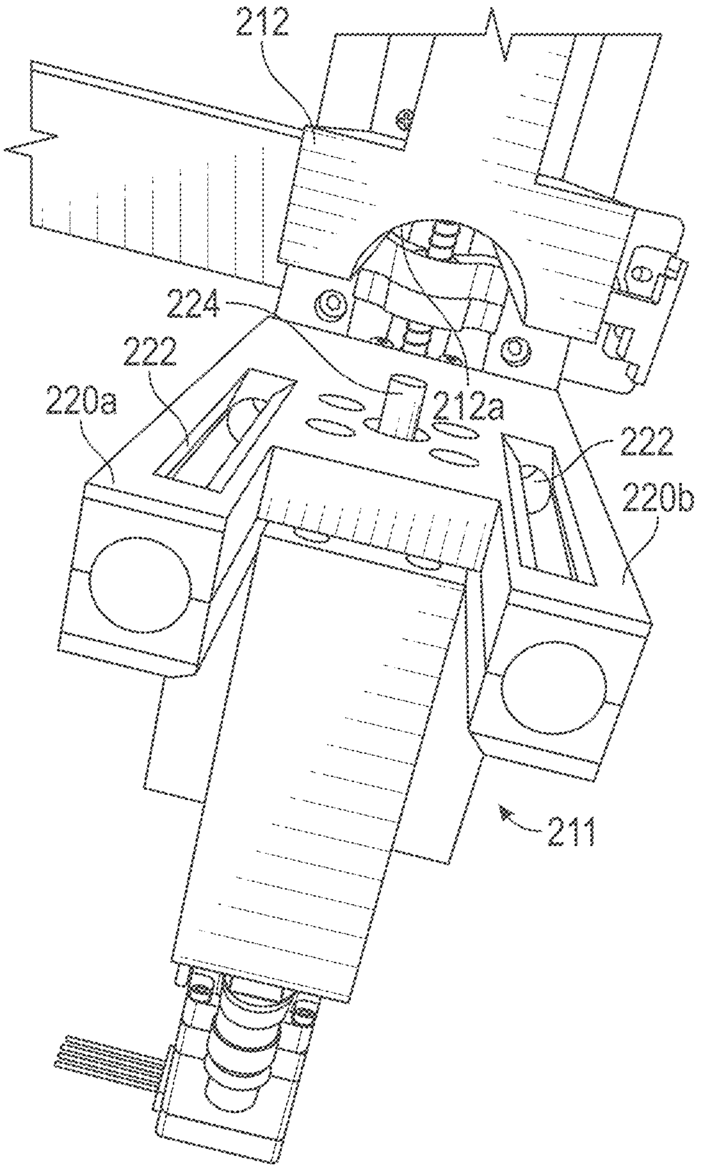

As best shown in FIG. 14E, first gripping paddle 211 may comprise a pair of blower rails 220*a*, 220*b* each extending from a respective medial or lateral side of a front edge of first gripping paddle 211. Each of blower rails 220*a*, 220*b* comprises a respective air blower duct 222, having an elongated cross-section or opening extending from the first gripping paddle 211 distally into the respective blower rail 220*a*, 220*b*. Each blower duct 222 is configured to blow a burst or stream of compressed air at an angle against the curled tail of the crawfish and/or shrimp to, thereby straighten the tail in preparation for first and second gripping paddles 211, 212 to close together and grip the uncurled tail on both sides. Accordingly, blower ducts 222 may be shaped to direct air at an angle of, e.g., 45 degrees from the horizontal. However, the present disclosure is not so limited and any suitable angle is also contemplated. One advantage of blower ducts 222 in FIGS. 14A-14E compared to the blower nozzles 222 of FIGS. 8-9 is that, by extending inward rather than projecting outward from paddle 211, the ducts reduce the probability of crawfish and/or shrimp getting caught between paddles 211,212 compared to protruding nozzles 222.

First gripping paddle 211 further comprises an injector nozzle 224 disposed adjacent to, or proximal of, the blower ducts 222 and proximal of blower rails 220*a*, 220*b*. When first and second gripping paddles 211, 212 are closed and the tail is gripped, injector nozzle 224 is configured to pierce the belly/tail of the crawfish and/or shrimp and inject the tail (e.g., abdomen) with air to, thereby, eject the tail meat from the shell. In some embodiments, a position of injector nozzle 224 is adjustable in at least one dimension, and as many as all three dimensions (e.g., one or more of up/down, left/right, forward/backward), with respect to the crawfish and/or shrimp-facing surface of paddle 211 to aid in proper positioning of injector nozzle 224 into each individual crawfish and/or shrimp tail abdomen for effectively ejecting each tail meat from the shell. In some embodiments, the position of injector nozzle 224 may be manually adjusted. In some other embodiments, the position of injector nozzle 224 may be automatically adjusted by one or more electric motors under control of control subsystem 600, with or without the aid of analysis and/or any determination of crawfish-injector nozzle 224 alignment from vision subsystem 700. Accordingly, vision system 700 may also be configured to determine, estimate or predict an alignment between injector nozzle 224 and the crawfish and/or shrimp abdomen based on one or more images from a camera (e.g., camera(s) 702 and/or 703) including at least injector nozzle 224 and the crawfish and/or shrimp abdomen.

To aid proper immobilization of the crawfish tail between gripping paddles 211, 212, a surface of second gripping paddle 212 facing first gripping paddle 211 may have a substantially curved and/or semi-cylindrical groove 212*a* disposed longitudinally therein, and configured to receive a portion of the crawfish tail therein (e.g., a dorsal section of the tail shell) to ensure tail gripping while preventing tail meat crushing. In some other embodiments, groove 212*a* may have a substantially "V" shape and/or may be padded, gel-coated and/or receive another treatment that increases grip with the crawfish and/or shrimp.

In some embodiments, pressure sensors (not shown) may be disposed on surfaces of first and/or second paddles 211, 212 or torque sensors (not shown) may be coupled to first and/or second paddles 211, 212 or to the motor shaft(s) driving paddles 211, 212 and may be configured to send signals indicative of an amount of subjected pressure or torque against the crawfish and/or shrimp to, for example, control subsystem 600 for use in determining an appropriate amount to move paddles 211,212 when gripping and/or releasing a crawfish and/or shrimp tail as described anywhere in this disclosure.

Discussion now turns to the use and function of tail-removing and meat-separating subsystem 200 in system 1000. As mentioned above, vision subsystem 700 is configured to determine an orientation of the crawfish and/or shrimp while robotic gripper assembly 310 is gripping the head of the crawfish and/or shrimp (see, e.g., FIGS. 21B and 21C). Vision subsystem 700 may be configured to send information regarding this determination to control subsystem 600 and, in some cases, control subsystem 600 may be configured to send information regarding this determination to tail gripping subsystem 200 directly, for use in tail-removing and meat-separating subsystem 200 inducing the appropriate axial rotation about rotatable coupler 216 to rotate gripper assembly 210, comprising first and second gripper paddles 211, 212, to the proper axial orientation, e.g., such that blower nozzles and/or ducts 222 are disposed under the belly of the crawfish and/or shrimp (or at least such that blower nozzles and/or ducts 222 face the curled side of the crawfish, which would be the belly). For example, vision subsystem 700 may be configured to capture one or more images of the crawfish utilizing, for example camera(a) 702 and/or 703, to identify relevant features of the crawfish (e.g., the eyes or belly) to determine the axial orientation of the crawfish and/or shrimp. In some embodiments, a crawfish and/or shrimp being moved by robotic gripper assembly 310 to a position opposite subsystem 200 may trigger vision subsystem 700 to send a signal to control subsystem 600, and/or to the axial-rotation components of subsystem 200 directly, to initiate appropriate rotation and extension of gripper assembly 210.

Seafood orienting subsystem 300 may be configured to move robotic gripper assembly 310 vertically on vertical rail 306 and horizontally by translating carriage 308 on horizontal rails 304 to achieve proper alignment of the gripped crawfish and/or shrimp with tail-removing and meat-separating subsystem 200. Such a proper alignment may be characterized by a closest portion of the crawfish to subsystem 200 being a predetermined, computer-calculated distance from gripper assembly 210 (e.g., half an inch closer to subsystem 200 than the farthest edge of gripping paddles 211, 212 of tail-removing and meat-separating subsystem 200). Robotic gripper assembly 310 is configured to maintain grip on the head (e.g., cephalothorax) of the crawfish and/or shrimp, while carriage 208 of subsystem 200 translates toward robotic gripper assembly 310 along horizontal rail 204 (e.g., along the y axis) and after tail gripping assembly 210 is axially rotated into place such that blower nozzles or ducts 222 are under the belly of the crawfish and/or shrimp. In some embodiments, the most distal tip of blower nozzles and/or ducts 222 is disposed a predetermined distance from where the underside of the head of the crawfish is gripped by robotic gripper assembly 310 (e.g., 3 cm). and then blower nozzles and/or ducts 222 are activated to blow compressed air toward the tail at a predetermined angle with respect to the horizontal (e.g., between 0 and 45 degrees,) to optimize the tail uncurling function.

While the tail is uncurled, vision subsystem 700 may capture one or more images of the crawfish while the head is being gripped by robotic gripper assembly 310 and vision subsystem 700 may utilize such images to determine a position and/or orientation of the crawfish to ensure the uncurled crawfish tail properly aligns between gripper paddles 211, 212 within tail gripping assembly 210 such that injector nozzle 224 is positioned to pierce the tail (e.g., abdomen) between the 3$^{rd}$ and 1rst Tergum closest to the telson/uropods. In some embodiments, vision subsystem 700 may capture one or more images of the crawfish while the head is being gripped by robotic gripper assembly 310 (e.g., via cameras 702 and/or 703) and vision subsystem 700 may utilize such images to determine an amount to extend carrier 208 of subsystem 200 along the horizontal bar 204, how much to close paddles 211, 212 and/or how much to adjust a relative position of injector nozzle 224 with respect to first gripping paddle 211 so as to ensure injector nozzle 224 is disposed in the proper alignment with respect to the gripped crawfish and/or shrimp with uncurled tail as described above. When the crawfish tail is uncurled and in the proper place related to the injector nozzle 224, the appropriate motors are driven to close the first and second gripper paddles 211, 212 based on control signals from, e.g., control subsystem 600 based on a determination of any one or more of a color, a pattern, a size, a shape, or identification of another defining characteristic(s) of the crawfish and/or shrimp from one or more images captured by vision subsystem 700. Once tail gripping assembly 210 is secured against the crawfish and/or shrimp tail, tail gripping assembly 210 is rotated about rotatable coupling 216 until the tail and head are separated. For example, a rotation of 180 degrees may be used. In some such embodiments, tail gripper assembly 210 may rotate a predetermined amount, e.g., 90 degrees and then subsystem 200 may retract tail gripper assembly 210 along horizontal rail 204 (e.g., along the y axis) away from robotic gripper assembly 310.

While not shown in figures, prior to discarding the separated head section, robotic gripper 310 is configured to maintain grip of the head while yellow fat is collected from inside the carapace through another vacuum tube. Once yellow fat has been collected the head (e.g., cephalothorax) is released by robotic gripper 310 and falls into receptacle 450 (see, e.g., FIG. 1).

In some embodiments, tail-removing and meat-separating subsystem 200 may comprise an additional vacuum port (not shown but, e.g., approximately ⅛$^{th}$ inch diameter tubing disposed approximately ¼ inch or closer to the portion of tail meat separated from the head), which may be disposed, oriented and configured to collect the yellow liver fat from both separated crawfish head and tail sections while the tail/abdomen is secured by tail gripper section 210 and prior to blowing the meat out of the tail shell. A benefit of collecting the yellow liver fat while the tail of the crawfish is secured, is that at this moment, the prior boiled crawfish meat has been sufficiently cooled for the yellow liver fat to coagulate and to no longer have a consistency similar to melted butter. At this moment, the crawfish is already in a secure grip and in position where the crawfish and/or shrimp can be moved toward the additional vacuum port or where the additional vacuum port can be moved toward the crawfish, while it is secured by tail gripper assembly 210. By contrast, if the yellow liver fat is collected after the meat is ejected from the shell, the process of ejecting the meat will cause the yellow liver fat to fragment and scatter, requiring the meat to be secured again prior to the evisceration process and making collection of the scattered yellow fat harder if carried out after the tail meat has been removed from the shell. Accordingly, it is desirable to collect the yellow fat when the tail meat is in the shell because the intestine, which needs to be eviscerated from the tail meat, is secured between the meat and shell and won't be accidentally sucked out while collecting the yellow fat. A similar process may be used to secure the yellow fat from the carapace section of the head.

In some embodiments, robotic gripper assembly 310 is configured to release the head (cephalothorax) section in the same area as tail gripping assembly 210 releases the meatless tail (e.g., abdomen) shell. Accordingly, in some embodiments, tail gripping assembly 210 is configured to be extended or retracted longitudinally such that the shell is released over the same receptacle 450 as the head. For example, as shown in FIG. 1, receptacle 450 may comprise three partitions 451, 452, 453. Partition 451 is configured to receive the tail shell, partition 453 is configured to receive the head, and partition 452 is configured to receive and direct the tail meat to conveyor belt subsystem 400. Accordingly, since both receive waste, partitions 451 and 453 may be connected to one another (e.g., to an underlying collective trash portion of receptacle 450). Since partition 452 is configured to receive the ejected tail meat, system 1000 may further comprise a pipe or tube 460 (see, e.g., FIGS. 1 and 13) coupled to, or forming at least a part of, partition 452 and configured to be moved into place before the tail meat will be ejected from the shell and after the meat is separated from the body and, in some cases, after the yellow fat has been collected. A purpose of tube 460 is to direct and/or collect moisture, meat and air away from the cameras of vision subsystem 700 and to direct the tail meat to conveyor belt subsystem 400.

Accordingly, tail gripper assembly 210 may be translated along horizontal rail 204 as necessary to dispose the tail meat into partition 452 and ultimately onto conveyor belt system 400, which is configured to move the tail meat to the eviscerating subsystem 500.

Discussion now turns to eviscerating subsystem 500. While not shown in the FIGs, conveyor belt 400 may have slanted sides disposed above and/or alongside it, similar to slanted sides 102 of subsystem 100 in FIG. 2, to guide the meat onto conveyor belt 400. In such embodiments, the crawfish meat, separated from the shell, falls a short distance (e.g., 2 inches or less) onto the slanted sides and/or conveyor belt 400 and is delivered to eviscerating subsystem 500.

Figure 15:
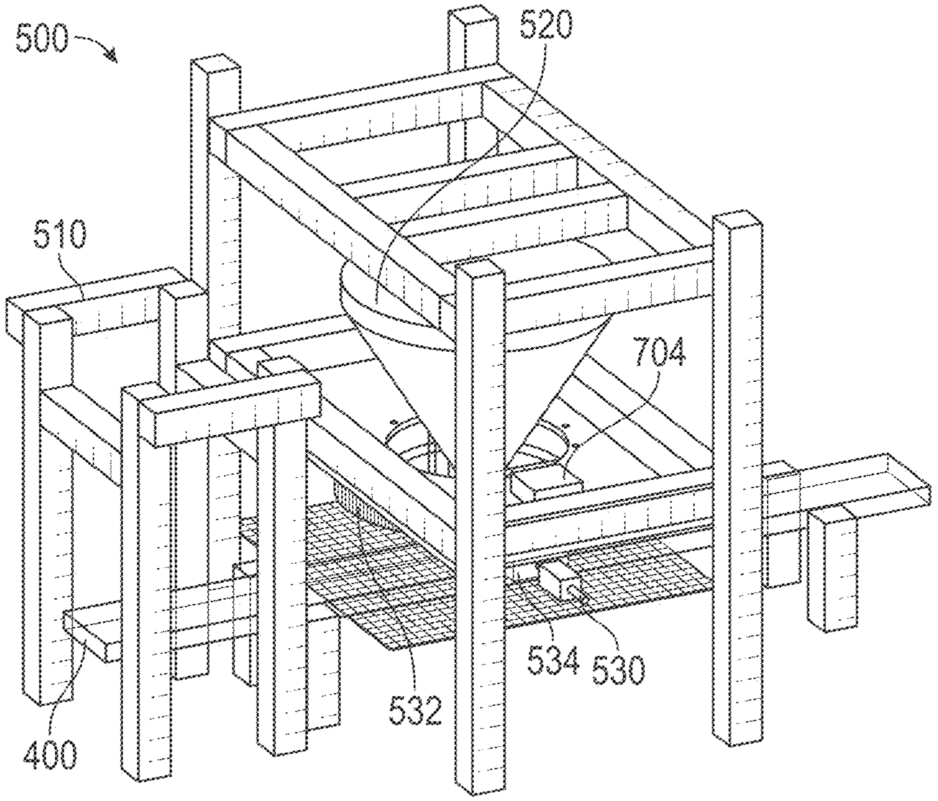
FIG. 15 is a perspective view of an eviscerating subsystem for the system of FIG. 1, according to some example embodiments.
Figure 16:
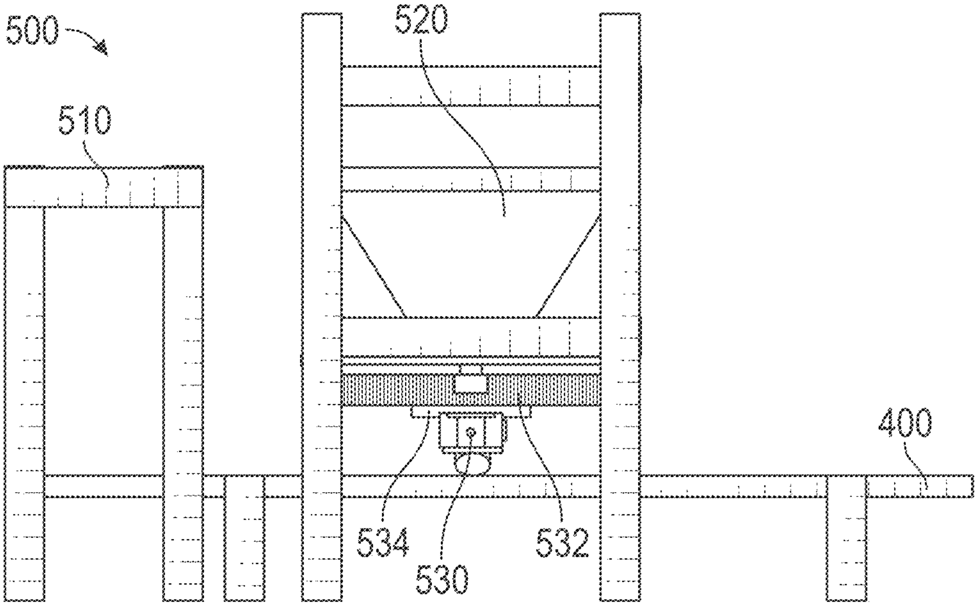
FIG. 16 is a side view of the eviscerating subsystem of FIG. 15.

FIGS. 15-20 illustrate several views of eviscerating subsystem 500, according to some example embodiments. As shown in FIGS. 15-16, eviscerating subsystem 500 comprises a framework 510. In some embodiments, framework 510 comprises a T-slot frame. However, the present disclosure is not so limited and framework 510 may comprise any suitable structure and/or material suitable for supporting the elements of eviscerating subsystem 500. Conveyor belt 400 is illustrated as extending through framework 510 and is configured to deliver the de-headed, deshelled crawfish and/or shrimp meat from subsystem 200 (e.g., tail meat with entrails).

Eviscerating subsystem 500 comprises an immobilizing assembly 520, a vacuum hose or port 530 for eviscerating the entrails from the tail meat utilizing suction, at least one carrier 534, and a slewing bearing 532. The immobilizing assembly 520 is disposed over conveyor belt 400 and is configured to deploy a subset of a plurality of elements 528 down onto and/or into portions of each crawfish corresponding to the meat and to not deploy elements 528 into portions of each crawfish corresponding to the areas containing entrails of the crawfish, as will be described in more detail below. In some embodiments, elements 528 comprise needles. However, the present disclosure is not so limited and any element configured to selectively immobilize predetermined portions of each crawfish are also contemplated.

Slewing bearing 532 is disposed over the conveyor belt 400 and around or at least adjacent to at least a portion of immobilizing assembly 520. Carrier(s) 534 is/are coupled to one portion of slewing bearing 532 (e.g., where multiple carriers are used, on diametrically opposite sides of bearing 532 to reduce required bearing 532 rotation range and increase eviscerating speed), while a second portion of slewing bearing is fixedly coupled to framework 510. In this way, carrier(s) 534 may be rotated in a substantially circular path about slewing bearing 532, for example as shown by the dotted double arrow in FIG. 20, when the first portion of the slewing bearing 532 is rotated with respect to the fixed second portion. In some embodiments, such rotation of carrier 534 may be carried out by a motor (not shown) mechanically coupled to one of the first and second portions of slewing bearing 532 and/or to carrier 534. In some embodiments, such a motor may be controlled by signals from control subsystem 600 based on one or more determinations carried out and/or made by vision subsystem 700, as will be described in more detail below. Carrier 534 is configured to hold vacuum hose or port 530 such that a distal tip of vacuum hose or port 530 is pointed substantially toward a position on conveyor belt 400 directly below a center of slewing bearing 532 regardless of rotation of carrier 534 on slewing bearing 532. In some embodiments, vacuum hose or port 530 is configured to be extended and/or retracted, for example as shown by the dotted line extension of hose or port 530 shown in FIG. 20. Such extension and/or retraction may be performed by a motor or servo (not shown) controlled by signals from control subsystem 600 based on one or more determinations carried out and/or made by vision subsystem 700 and/or control subsystem 600, in order to dispose the distal tip of vacuum hose or port 530 as close as possible, or practical, to the appropriate portions of each crawfish tail meat, in order for vacuum hose or port 530 to reliably suck out the entrails on the back side of the crawfish tail meat, as will be described in more detail below.

Eviscerating subsystem 500 may further be integrated with vision subsystem 700 at least in that camera 704, may be disposed on any suitable portion of framework 510, or of any other portion of subsystem 500, and may be configured to generate one or more images of each crustacean. Specifically, vision subsystem 700 may be configured to analyze such images to determine which portions of each crawfish correspond to meat and which other portions correspond to entrails (or comprise entrails). For example, FIGS. 23A-26B illustrate examples of such analyzation and determination for each of several examples of de-headed and deshelled crawfish. In these figures, the “A” image is an example of an image generated by camera 704 on conveyor belt 400, while the corresponding “B” image indicates a result of the above-described analyzation and determination. For example, each of FIGS. 23A, 24A, 25A and 26A illustrate a captured or generated image of a crawfish on a conveyor belt. Portions 900 are meat of each crawfish, while portions 910 are portions including entrails/intestines. 920 illustrates the conveyor belt, or background of each image. Each of FIGS. 23B, 24B, 25B and 26B illustrate modifications of the respective images in FIGS. 23A, 24A, 25A and 26A, where the meat portions 900 are depicted a first color 950 (e.g., green) and the entrail portions 910 are depicted a second color 960 (e.g., red).

Visual subsystem 700 may utilize and/or analyze the captured “A” images and/or the generated “B” images to determine which elements 528 of immobilizing assembly 520 to extend down onto and/or into the crawfish and/or shrimp and which elements 528 of immobilizing assembly 520 to retract or not extend down onto and/or into the crawfish portions. Specifically, elements 528 that are directly over the portions corresponding to color 950 are identified as those to be extended, and elements 528 that are directly over the portions corresponding to at least color 960 and also color 970 are identified as those to be retracted, or not extended.

Aspects of the crawfish and/or shrimp in the images from camera 704 that visual subsystem 700 may take into account in determining the portions corresponding to 950 and 960 may include but are not limited to the color, shape and thickness of one or more portions of the crawfish. For example, boiled crawfish naturally curl their tails inward toward the belly such that the belly lies on the concave side, while the entrails lie near the opposite, convex edge of the crawfish. Accordingly, one determination that may be made utilizing an algorithm by visual subsystem 700 is to identify the opposite, convex edge and then to correspond that edge to the entrails and, so, assign a coloration similar to or the same as 960 to those portions of each crawfish image, while identifying the concave edge and then to correspond that portion to meat and, so, assign a coloration similar to or the same as 950 to those portions of each crawfish image. In some embodiments, such an algorithm may also use such determinations to identify a beginning and an end of each tail meat, e.g., which portion of the tail meat was previously connected to the carapace and which portion of the tail meat was connected to the telson. Here, as for any computation and/or determination made by either visual subsystem 700 or control system 600, any one or more determinations and/or computations may be carried out with the aid and/or use of artificial intelligence, machine learning and/or any other suitable computational technology. Such identifications, or indications thereof, may be transmitted from visual subsystem 700 to control subsystem 600 for generation of control signals for operating immobilizing assembly 520 and/or carrier 534 and vacuum hose/port 530. Specifically, in some embodiments, carrier 534 may be rotated until hose/port 530 is disposed immediately adjacent the end of the tail meat that was previously connected to the carapace and then rotated along the convex side about the meat, while suction is performed, until hose/port 530 passes the other end of the tail meat, eviscerating the intestinal tract.

Figure 27A:
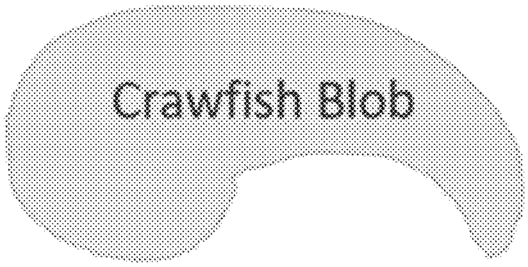
FIGS. 27A-27C show different computer-generated images that illustrate an example process for generating the computer-generated classifications of portions of the images of crustacean in FIGS. 23A-26B, according to some example embodiments.
Figure 27B:
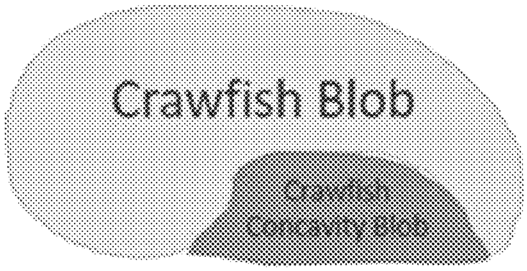
Figure 27C:
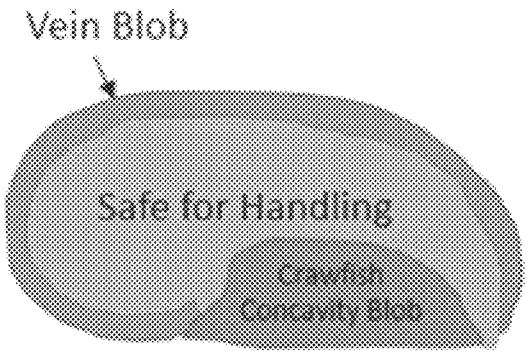

FIGS. 27A-27C show different images related to computer vision methods for classifying regions of an image into several categories, for example: a background, crawfish tail meat, and the crawfish vein and/or entrails. Such methods are useful at least for determining the location of crawfish meat that can be handled, for example by immobilizing assembly 520, without obstructing the vein and/or entrails from being removed. While this description is not so limited, generation of any images of FIGS. 27A-27C may be carried out by vision subsystem 700.

FIG. 27A illustrates the use of a color threshold process to distinguish between the crawfish and the background. Such a process may center such a color threshold on color bands that focus, for example, on light pink colors. A binary image may be generated by applying such a focused color threshold to an image of the seafood, for example the crawfish, for example captured by vision subsystem 700 such that all pixels corresponding to the crawfish have a first value (e.g., 1) and all remaining background pixels have a second value different from the first value (e.g., 0). The largest collection of such connected crawfish pixels is identified as the “Crawfish Blob” shown in FIG. 27A.

FIG. 27B illustrates utilizing binary analysis to fill in the concavities of the crawfish blob in the generated image of FIG. 27A. For example, the original crawfish blob from the images in FIG. 27A may be subtracted from this image and all but the largest continuously connected collection of pixels are deleted. The result is the portion of the image in FIG. 27B identified as the “Crawfish Concavity Blob” and represents a region of the image that includes the empty space within the curl of the crawfish’s tail.

FIG. 27C illustrates an image in which all pixels on the Crawfish Blob that are within a specified distance of the perimeter of the Crawfish Blob and that are not within a specified distance of the Crawfish Concavity Blob, e.g., all areas of the image that are close to the edge but along the outside curve of the crawfish are shown in red and identified as the "Vein Blob." The image in FIG. 27C may be saved as a binary image with the vein pixels equal to a first value, e.g., 1, and the non-vein pixels equal to a second value different from the first value, e.g., 0. Regions of the image in FIG. 270 that are considered to be safe to handle are areas included in the Crawfish Blob but not within the Vein Blob.

Accordingly, the image of FIG. 27C may be converted and/or saved as an image corresponding to the images in FIGS. 23B, 24B, 25B and 26B for example, such that the red areas of the "vein blob" correspond to red areas 960 of those images of FIGS. 23B-26B and the green areas of the "crawfish blob" that are not also in the "vein blob" correspond to the green areas 950 of those images of FIGS. 23B-26B. In such embodiments, the blue area of the "crawfish concavity blob" and all parts of the image not in green or red, correspond to the background 970 in those images of FIGS. 23B-26B.

Figure 17:
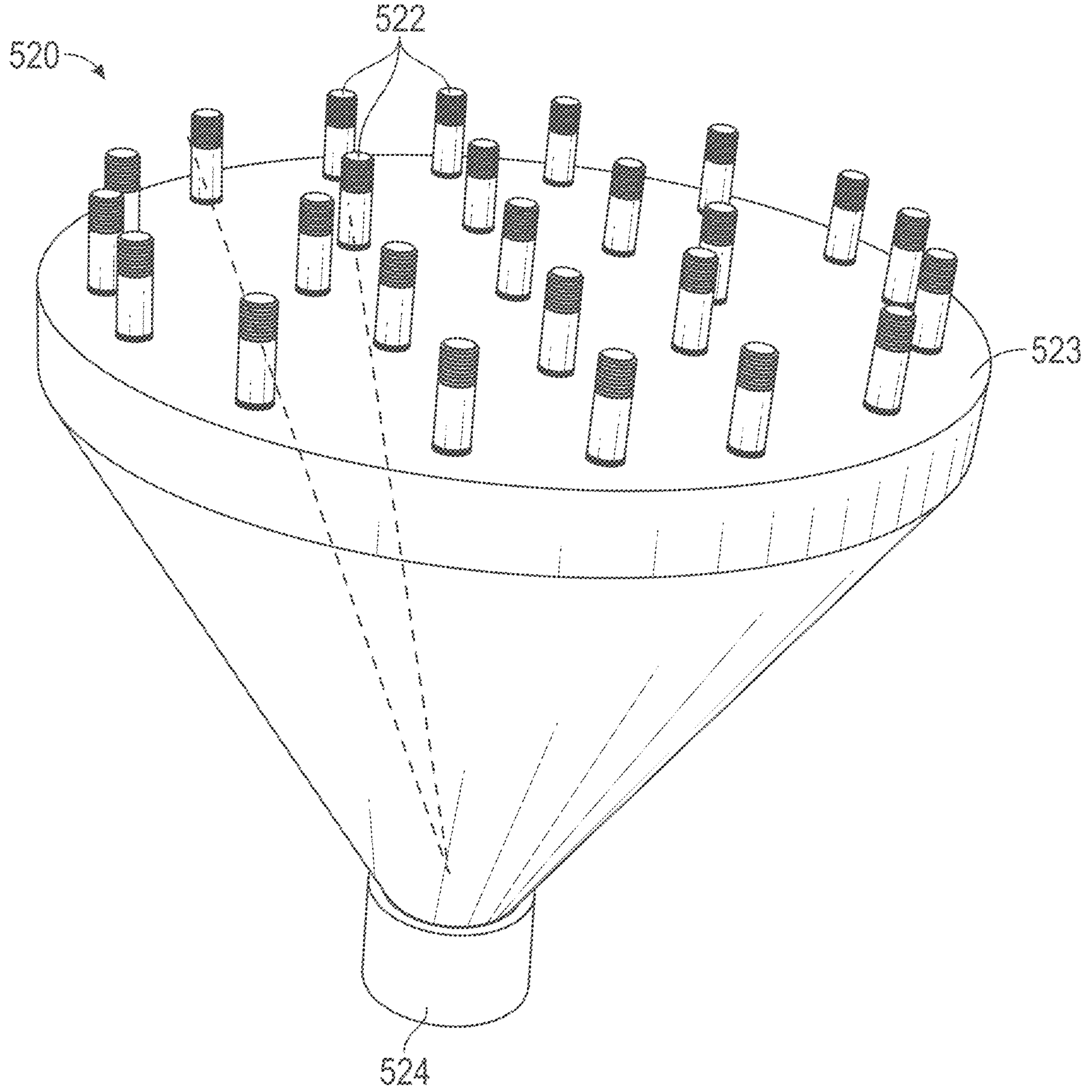
FIG. 17 is a perspective top view of an immobilizing assembly of an eviscerating subsystem, according to some example embodiments.
Figure 18:
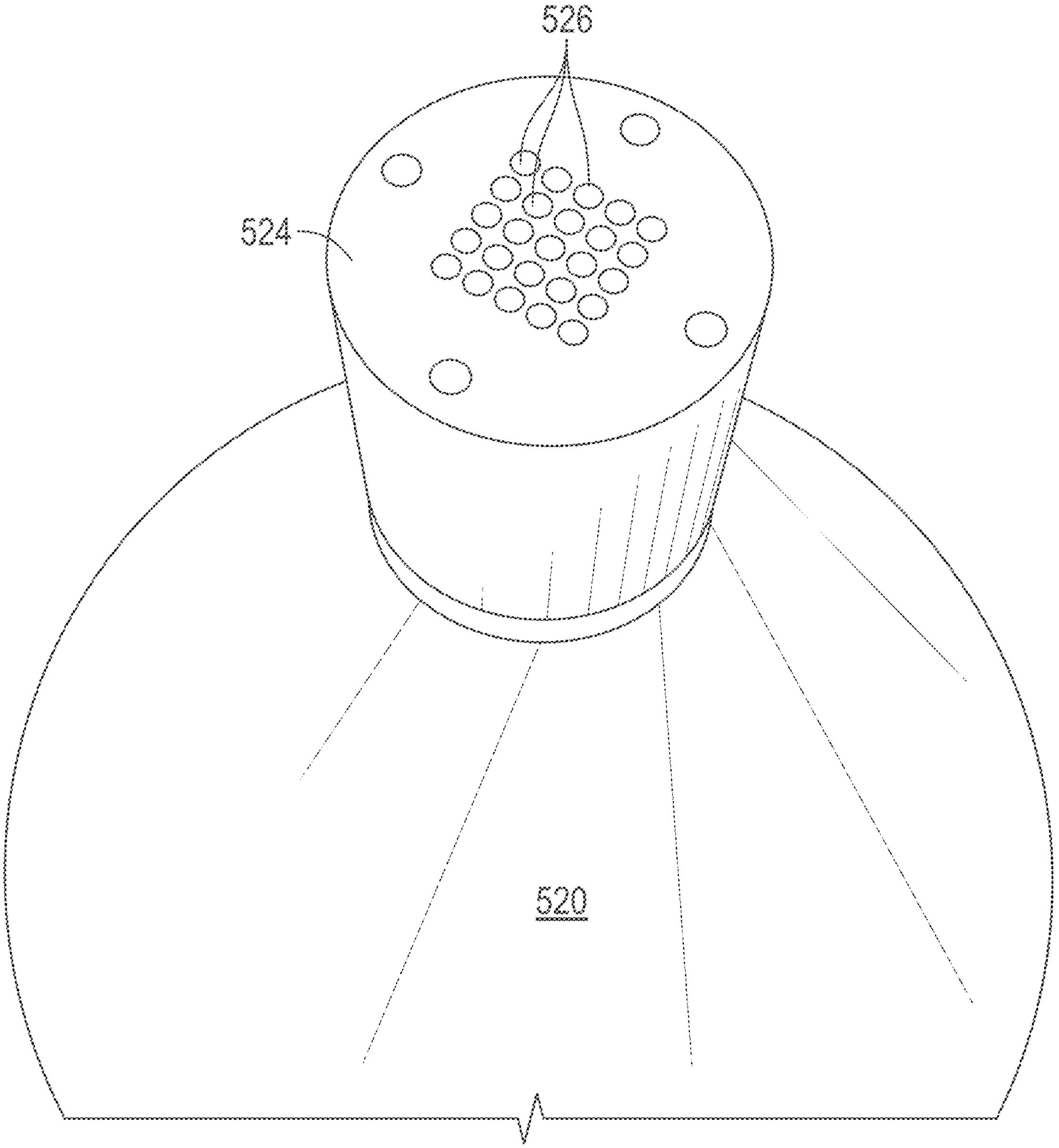
FIG. 18 is a perspective bottom view of the immobilizing assembly of FIG. 17, according to some example embodiments.
Figure 19:
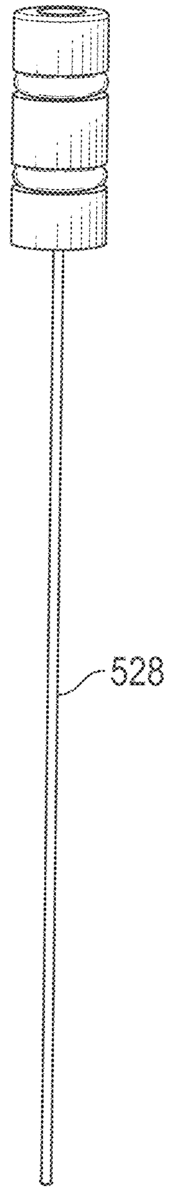
FIG. 19 is a side view of an immobilizing element for an immobilizing assembly of an eviscerating subsystem, according to some example embodiments.
Figure 20:
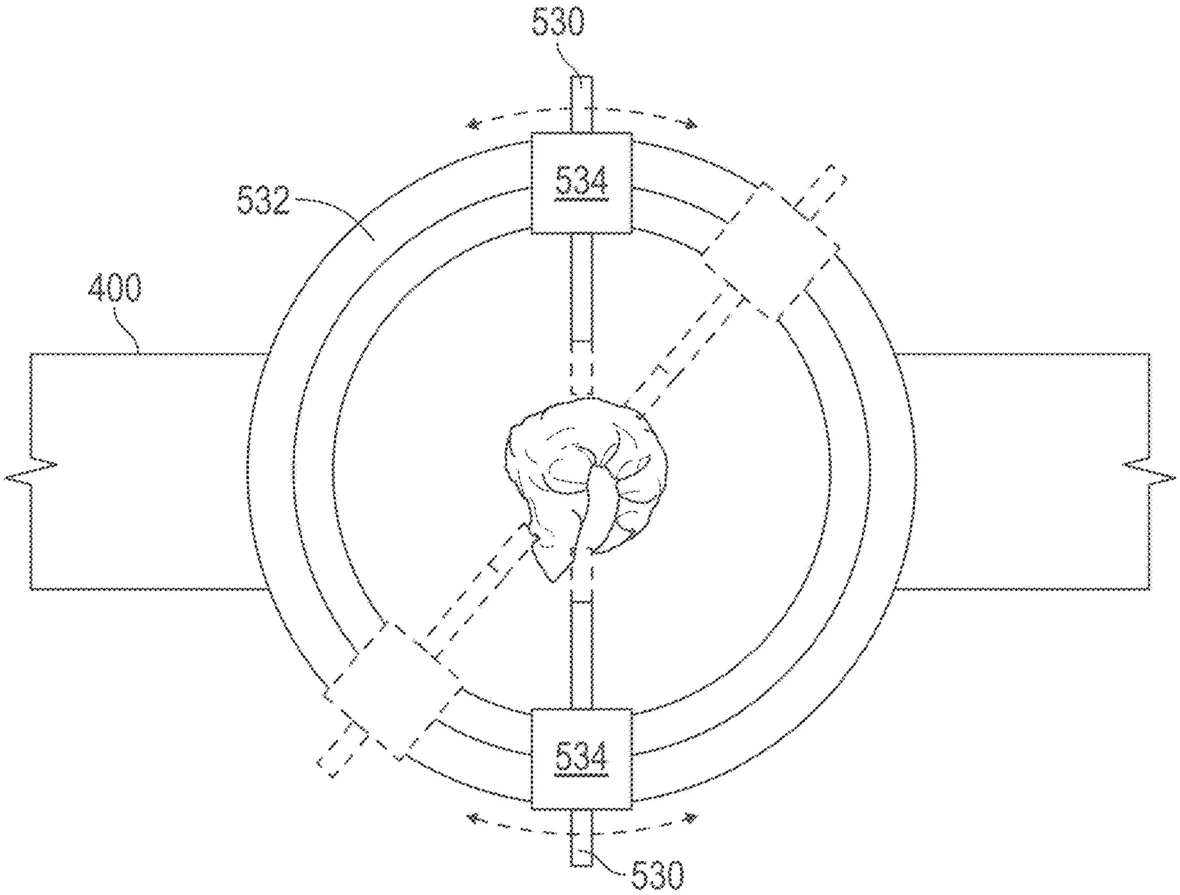
FIG. 20 is a top view of a portion of an eviscerating subsystem, according to some example embodiments.

Turning back to discussion of eviscerating subsystem 500, as shown in FIGS. 17-18, immobilizing assembly 520 comprises a proximal end 523 and a distal end 524. The shape of immobilizing assembly 520 may be substantially conical. For example, immobilizing assembly 520 may taper from proximal end 523, to distal end 524, although the present disclosure is not so limited and immobilizing assembly 520 may have any suitable shape. Distal end 524 comprises a plurality of apertures 526, each holding an element 528. In some examples, apertures 526 are arranged in an array a predetermined distance apart from one another, e.g., 5 mm center to center between apertures 526, though the present disclosure is not so limited any suitable spacing, evenly, unevenly or randomly distributed are also contemplated. Proximal end 523 comprises a plurality of pneumatic couplings 522, each coupled to a solenoid (not shown) that, when pressurized by a pressurized fluid introduced through the respective pneumatic coupling 522, causes extension of an element 528 through its respective aperture 526. While elements 528 are illustrated, the present disclosure is not so limited and any other suitable method of immobilizing select portions of a crawfish are also contemplated, for example, tampers, bars, fins or any other suitable extension may be caused to physically push against and immobilize those select portions of a crawfish. In further alternative, elements 528 (and any other related elements) may be replaced with a plurality of vacuum ports, coupled to a face of distal end 524, and configured to secure the tail meat while port 530 rotates and eviscerates section(s) 960 of the tail.

Control subsystem 600 may control the pneumatics responsible for the individual functioning of each element 528. For example, when crawfish tail meat is disposed directly under distal end 524 of immobilizing assembly 520, control subsystem 600 may be configured to extend the elements 528 directly over portions of the crawfish corresponding to color 950 in the "B" image generated for that crawfish, and to retract or at least not extend the elements 528 directly over portions of the crawfish corresponding to color 960 or color 970, e.g., any color other than color 950. In this way, the elements 528 are only extended down onto and/or into portions of the crawfish that are to be retained, while leaving the remaining portions mobilizable to be evacuated by vacuum hose or port 530. Once the appropriate elements 528 are extended and are holding the crawfish, control subsystem 600 may control carrier 534 to rotate through a predetermined angle (e.g., 270 degrees) either clockwise or counterclockwise, for example from the end at which the head was previously attached to the tail, toward the end of the tail not attached directly to the head to achieve optimal evisceration, while vacuum hose or port 530 is activated. In some embodiments, where vacuum hose or port 530 is configured to be extended or retracted, control subsystem 600 may be further configured to generate the control signals for such extension or retraction. In this way, the entrails may be reliably removed by the single passing of vacuum hose or port 530 along the crawfish, for example from where the head would be toward the end of the tail.

Once the entrails have been removed, elements 528 of immobilizing assembly 520 are retracted and the crawfish meat is moved, by conveyor belt 400, to a final station (not shown) for reviewing whether all crawfish tail meat are being cleaned and eviscerated appropriately. In some embodiments, such a final station may be automated utilizing vision subsystem 700, or similar, and may be configured to utilizing one or more methods to verify whether the crawfish meat was acceptably cleaned and eviscerated. In such embodiments, crawfish meat determined to be acceptably cleaned and eviscerated may continue down the line (e.g., conveyor belt 400), while crawfish meat determined not to be acceptably cleaned and eviscerated may be pushed off of the line (e.g., conveyor belt 400) utilizing a pusher (not shown). In some embodiments, such a pusher may have a substantially "V" shape, or similar double-slanted shape, with the opening of the "V" opening perpendicular to the direction of travel of conveyor belt 400 such that crawfish meat to be pushed off the line is actually pushed off the line, rather than nudged farther down or up line when the pusher is activated to extend in a direction perpendicular to the direction of travel of conveyor belt 400.

The present disclosure also contemplates utilizing and/or integrating any design described in U.S. Pat. No. 5,055,085A to Glenn Thibodeaux, which is incorporated in its entirety herein by reference.

Example Method(s) of Use

Figure 28:
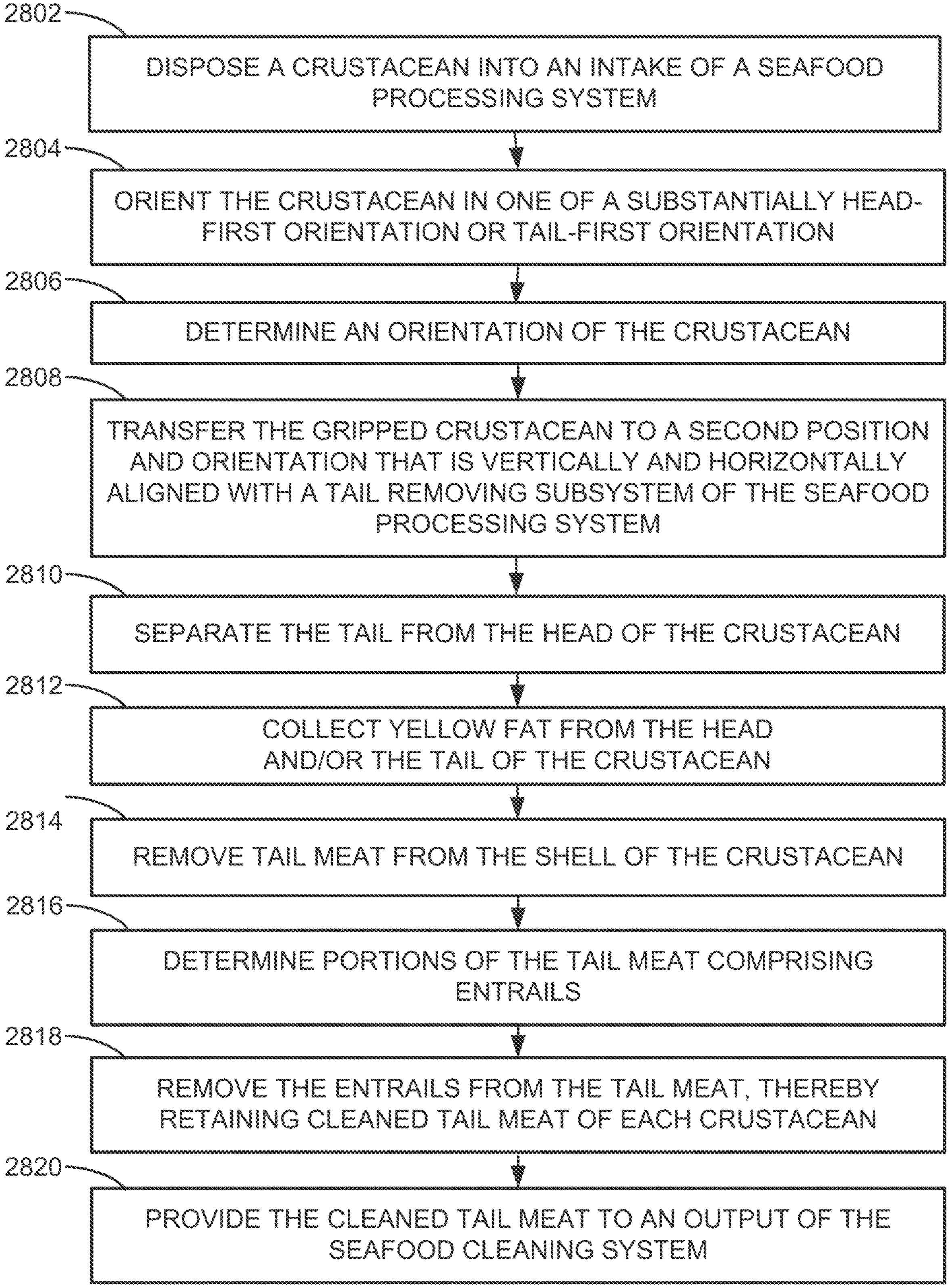
FIG. 28 is a flowchart related to a method of utilizing a seafood processing system, according to some example embodiments.

The disclosure now turns to FIG. 28, which illustrates a flowchart 2800 related to a method of utilizing a seafood processing system, as described anywhere in this disclosure. Although particular steps are described herein, the present application is not so limited and alternative methods may include a subset of these steps, in the same or different order, combined or mixed in any order, and may include one or more addition steps not described herein or below. Moreover, while one or more subsystems may be described as carrying out a step, the present disclosure is not so limited and any portion of a step, any step or any grouping of steps are also contemplated to be carried out by a different subsystem, or such portions, steps or grouping of steps may be combined in a way such that they are no longer separate steps.

Step 2802 includes disposing crustaceans into an intake of a seafood processing system. For example, and not limitation, as previously described in connection with at least FIGS. 1-2, a user of system 1000 may dispose crawfish and/or shrimp, either raw or pre-boiled and one or several at a time by any means and in any orientation, into yaw-orienting subsystem 100 of seafood cleaning system 1000.

Step 2804 includes orienting each crustacean in one of a substantially head-first orientation or a substantially tail-first orientation. For example, and not limitation, as previously described in connection with at least FIG. 2, dropping crawfish and/or shrimp onto slanted sides 102 of yaw-orienting subsystem 100 while conveyor belt 104 is driven causes the crawfish and/or shrimp to automatically orient themselves in a predetermined direction or orientation, e.g., substantially parallel to the direction of travel of conveyor belt 104 and in one of a head-first orientation or a tail-first orientation. This process may be accomplished with or without input and/or involvement of vision subsystem 700 and/or controller subsystem 600.

Step 2806 includes determining an orientation of the crustacean. For example, and not limitation, as previously described in connection with at least FIG. 1, in some embodiments, camera 701 and/or 703 of vision subsystem 700 may be configured to capture or generate one or more images of the crustacean disposed at a distal end of conveyor belt 104. This may occur before the crustacean is gripped by robotic gripping assembly 310 of subsystem 300 or while being gripped by robotic gripping assembly 310 of subsystem 300. Such a determination may also be made after step 2808 while the crustacean is being gripped by robotic gripping assembly 310 and vertically and horizontally aligned with tail removing subsystem 300. Vision subsystem 700 may analyze the one or more images to identify features of the crawfish and/or shrimp such as eyes, the belly, a number of legs (e.g., 8) and/or areas having a lighter shade of a particular color (e.g., red) to determine relative orientation, which may comprise head-first or tail-first determination, an axial-orientation of the crustacean, a location on conveyor 104, and/or identification of the head section (cephalothorax) and/or tail section (abdomen) of the crustacean.

Step 2808 includes transferring the crustacean to a second position and orientation that is vertically and horizontally aligned with a tail removing subsystem of the seafood processing system. For example, and not limitation, as previously described in connection with at least FIGS. 1 and 3-7, in some embodiments, control subsystem 600 may provide at least one control signal causing orientation of robotic gripper assembly 310 such that first plurality of gripper fingers 311 and second plurality of gripper fingers 312 are open and disposed adjacent opposite sides of the head of the crustacean in a first position and orientation. The robotic gripper assembly 310 may then be controlled to close one or more of the individually controllable gripping units (e.g., opposing pairs of fingers 311, 312) by a predetermined amount to, thereby, grip the head of the crustacean. The robotic gripper assembly 310 may then be controlled to perform predetermined amounts of translating carriage 308 along horizontal rail 304, translating vertical rail 306 along carriage 308, and rotating robotic gripper assembly 310 to transfer the gripped crustacean to a second position and orientation that is tail-toward and vertically and horizontally aligned with tail removing subsystem 200. Such a second position may be a suitable position in preparation for removal of the tail from the head of the crustacean.

Step 2810 includes separating the tail from the head of the crustacean. For example, and not limitation, as previously described in connection with at least FIGS. 8-9 or FIGS. 14A-14E, based at least in part on a determination of an orientation of the crustacean by vision subsystem 700, tail gripping assembly 210 may be controlled to rotate by a predetermined amount such that first paddle 211 is facing the belly of the crustacean when the crustacean is vertically and horizontally aligned with tail gripping assembly 210. For example, such a determination of the orientation of the crustacean may be based on analysis of one or more images of the crustacean captured by camera 702 and/or camera 703 while the crustacean is being gripped by robotic gripper assembly 310 and vertically and horizontally aligned with tail removing subsystem 200.

Upon alignment of tail gripping assembly 210 with the gripped crustacean, carriage 208 may be horizontally translated along horizontal rail 204 by a predetermined amount to, thereby, extend tail gripping assembly 210 sufficiently that at least a portion of the curled tail of the crustacean is disposed adjacent blower nozzles 222 or blower ducts 222 and between first and second gripping paddles 211, 212. A stream of compressed air may then be directed from blower nozzles 222 or blower ducts 222 against the belly of the crustacean to, thereby, uncurl the tail. First and second gripping paddles 211, 212 may then be closed by a predetermined amount to grip the uncurled tail of the crustacean and to simultaneously cause injector nozzle 224 to pierce the shell of the uncurled tail. As previously described, tail gripping assembly 210 may then be rotated with respect to carriage 208 by a predetermined amount to, thereby, separate the gripped head from the gripped tail.

Step 2812 includes collecting yellow fat from the tail in the shell. For example, and not limitation, as previously described (but not shown) in connection with at least FIG. 8-9 or 14A-14E, tail removing subsystem 200 may comprise an additional vacuum port (not shown), which may be disposed, oriented and configured to collect the yellow liver fat from the crustacean while the tail is secured by tail clamping assembly 210. Robotic gripping assembly 310 may then release the severed head of the crustacean, which may fall down a slide to a collection bin, e.g., head waste portion 453 of receptacle 450 (see, e.g., FIG. 1).

Step 2814 includes removing tail meat from the shell of the crustacean. For example, and not limitation, as previously described (but not shown) in connection with at least FIG. 8-9 or 14A-14E, closing first and second gripping paddles 211, 212 by the predetermined amount to grip the uncurled tail of the crustacean simultaneously causes injector nozzle 224 to pierce the shell of the uncurled tail. Accordingly, injector nozzle 224 may then be controlled to inject compressed air between the shell and tail meat of the crustacean to, thereby, eject the tail meat from the shell. The tail meat may be directed to tube 460, which directs the tail meat to conveyor belt 400, which conveys tail meat to eviscerating subassembly 500. Once the tail meat is ejected from the shell, first and second gripping paddles 211, 212 may be configured to open and release the shell into a collection bin, e.g., shell waste portion 451 of receptacle 450 (see, e.g., FIG. 1).

Step 2816 includes determining portions of the tail meat comprising entrails. For example, and not limitation, as previously described in connection with at least FIG. 1, in some embodiments, camera 704 of vision subsystem 700, which may be disposed within eviscerating subsystem 500, may be configured and/or caused to capture or generate one or more images of the tail meat while disposed on conveyor belt 400 and/or aligned with a center of slewing bearing 532 (see, e.g., FIGS. 15-20 and 23A-27C). Vision subsystem 700 may analyze the one or more images of the crustacean tail meat disposed within eviscerating subsystem 500 to determine portions of the tail meat comprising entrails 960, with the remaining portions 950 of the tail meat being determined not to comprise entrails as previously described. Such an algorithm may also use such determinations to identify the head and tail end of each deshelled tail meat, e.g., which end of the meat was previously connected to the carapace. Visual subsystem 700 may transmit such identifications or indications to control subsystem 600.

Step 2818 includes evacuating the entrails from the tail meat, thereby retaining cleaned tail meat of each crustacean. For example, and not limitation, as previously described in connection with at least FIGS. 15-27C, control subsystem 600 may generate control signals for operating immobilizing assembly 520, carrier 527, slewing bearing 532 and vacuum hose/port 530. When a de-headed and deshelled crawfish is disposed directly under distal end 524 of immobilizing assembly 520, control subsystem 600 may be configured to cause a first subset of the plurality of immobilizing elements 528 to extend and contact portions 950 of the tail meat determined to not comprise entrails and retract or at least not extend a second subset of the plurality of immobilizing elements 528 and avoid contact with the portions 960 of the tail meat determined to comprise entrails. Carrier 534 is rotated on slewing bearing 532 so as to dispose extendible vacuum port 530 adjacent an end of the tail meat previously connected to the head of the crustacean. Extension of extendible vacuum port 530 may be controlled to position vacuum port 530 immediately adjacent the end of the tail meat previously connected to the head of the crustacean. Carrier 534 is rotated on slewing bearing 532 while vacuum port 530 suction is activated such that the distal end of vacuum port 530 passes along a convex side of the tail meat from the end of the tail meat previously connected to the head to an opposite end of the tail meat, thereby, eviscerating the entrails from the tail meat.

Step 2820 includes providing the cleaned tail meat to an output of the seafood cleaning system. For example, as previously described in connection with at least FIGS. 15-20, the crawfish meat is moved, by conveyor belt 400, to a final station for reviewing whether the crawfish are being cleaned and eviscerated appropriately.

In some embodiments, flowchart 2800 further comprises a step 2822, which may include verifying whether the meat has been acceptably cleaned and eviscerated. For example, as previously described, vision subsystem 700 may be configured to capture or generate one or more images of the eviscerated tail meat and may analyze the image(s) to determine whether the meat has been acceptably cleaned and eviscerated. Meat that has been acceptably cleaned and eviscerated may continue down the line (e.g., conveyor belt 400), while crawfish meat determined not to be acceptably cleaned and eviscerated may be pushed off of the line (e.g., conveyor belt 400) utilizing a pusher (not shown).

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A system for processing seafood, the system comprising:
- a first gripping assembly comprising:
  - a first plurality of gripper fingers; and
  - a second plurality of gripper fingers,
  - wherein each of the second plurality of gripper fingers is-disposed opposite a respective one of the first plurality of gripper fingers to form an individually controllable gripping unit;
- a second gripping assembly comprising:
  - a first gripping paddle comprising:
    - a blower rail extending from an edge of the gripping paddle,
    - at least one blower nozzle or blower duct disposed on the blower rail and configured to direct a stream of compressed air, and
    - an injector nozzle configured to eject compressed air, and
  - a second gripping paddle configured to cooperate with the first gripping paddle.

2. The system of claim 1, further comprising:
- a first horizontal rail;
- a first carriage configured to translate horizontally along the first horizontal rail; and
- a first vertical rail configured to translate vertically along the first carriage, wherein the first gripping assembly is rotatably coupled to the first vertical rail.

3. The system of claim 2, wherein, based on at least one control signal received from a control subsystem, the system is configured to:
- position the first gripping assembly such that the first plurality of gripper fingers and the second plurality of gripper fingers are open and disposed in a first position and orientation;
- close one or more of the individually controllable gripping units by a predetermined amount; and
- perform at least one of: translating the first carriage along the first horizontal rail, translating the first vertical rail along the first carriage, and rotating the first gripping assembly to thereby position the first gripping assembly in a second position and orientation.

4. The system of claim 1, further comprising:
- a second horizontal rail; and
- a second carriage configured to translate horizontally along the second horizontal rail, wherein the second gripping assembly is rotatably coupled to the second carriage.

5. The system of claim 4, wherein, based on at least one control signal received from a control subsystem, the system is configured to:
- rotate the second gripping assembly by a predetermined amount;
- horizontally translate the second carriage along the second horizontal rail by a predetermined amount;
- direct a stream of compressed air from the at least one blower nozzle or blower duct;
- close the first and second gripping paddles by a predetermined amount;
- rotate the second gripping assembly with respect to the second carriage by a predetermined amount; and
- eject compressed air from the injector nozzle.

6. The system of claim 1, wherein the at least one blower nozzle is disposed at an angle of approximately 45 degrees with respect to the blower rail.

7. The system of claim 1, wherein:
- the blower rail comprises a first blower rail extending from a first portion of the first gripping paddle; and
- the first gripping paddle further comprises a second blower rail extending from a second portion of the first gripping paddle opposite the first portion.

8. The system of claim 7, wherein the at least one blower nozzle comprises:
- a first plurality of blower nozzles extending away from the first blower rail at a first angle back toward a proximal portion of the first gripping paddle; and
- a second plurality of blower nozzles extending away from the second blower rail at a second angle back toward the proximal portion of the first gripping paddle.

9. The system of claim 8, wherein:
the first angle at which the first plurality of blower nozzles extend away from the first blower rail is also tipped toward a centerline of the first gripping paddle so as to direct the stream of compressed air toward the centerline of the first gripping paddle.

10. The system of claim 7, wherein the at least one blower nozzle or blower duct comprises:
a first blower duct having an elongated cross-section disposed in the first blower rail and configured to direct the stream of compressed air at an angle back toward a proximal portion of the first gripping paddle; and
a second blower duct having the elongated cross-section disposed in the second blower rail and configured to direct the stream of compressed air at an angle back toward the proximal portion of the first gripping paddle.

11. The system of claim 7, wherein a position of the injector nozzle is adjustable with respect to the first gripping paddle in at least one dimension.

12. The system of claim 1, wherein an inward facing surface of the second gripper paddle comprises a longitudinal groove.

13. The system of claim 1, further comprising an eviscerating subsystem, the eviscerating subsystem comprising:
an immobilizing assembly comprising a plurality of immobilizing elements configured to be individually extended from the immobilizing assembly;
a slewing bearing disposed adjacent to the immobilizing assembly;
a carrier coupled to the slewing bearing and configured to move in a substantially circular path about the slewing bearing; and
an extendible vacuum port coupled to the carrier and oriented toward a center of the slewing bearing.

14. The system of claim 13, wherein, based on at least one control signal received from a control subsystem, the eviscerating subsystem is configured to:
extend a first subset of the plurality of immobilizing elements and retract a second subset of the plurality of immobilizing elements;
rotate the carrier on the slewing bearing so as to dispose the extendible vacuum port in a first position;
extend the extendible vacuum port from the first position to a second position; and
rotate the carrier on the slewing bearing while the vacuum port is activated such that a distal end of the vacuum port passes along a substantially circular path from the second position.

15. The system of claim 13, wherein the immobilizing elements comprise needles.

16. The system of claim 13, comprising a vision subsystem configured to make one or more determinations related to controlling the system, the vision subsystem comprising:
at least one camera configured to capture or generate one or more images of the seafood;
at least one processor;
at least one memory comprising non-transient computer readable medium comprising code that, when executed by the at least one processor, causes the vision subsystem to:
cause the at least one camera to capture or generate the one or more images of the seafood;
analyze the one or more images of the seafood to determine portions of the seafood comprising entrails; and
generate at least one indication of the portions of the seafood determined to comprise entrails, the at least one indication for use by the control subsystem to generate one or more control signals for at least one of:
extending a first subset of the plurality of immobilizing elements to contact portions of the seafood not determined to comprise entrails and retracting a second subset of the plurality of immobilizing elements to avoid contact with the portions of the seafood determined to comprise entrails;
rotating the carrier on the slewing bearing so as to dispose the extendible vacuum port in a first position;
controlling extension of the extendible vacuum port to position the vacuum port in a second position; and
rotating the carrier on the slewing bearing while the vacuum port is activated such that a distal end of the vacuum port passes along a subantially circular path from the second position.

17. The system of claim 1, comprising a vision subsystem configured to make one or more determinations related to controlling the system, the vision subsystem comprising:
at least one camera configured to capture or generate one or more images of the seafood;
at least one processor;
at least one memory comprising non-transient computer readable medium comprising code that, when executed by the at least one processor, causes the vision subsystem to:
cause the at least one camera to capture and/or generate the one or more images of the seafood;
analyze the one or more images of the seafood to determine an orientation of the seafood; and
generate at least one indication of the determined orientation of the seafood for use by the control subsystem to generate one or more control signals for at least one of:
rotating the second gripping assembly by a predetermined amount to a first position and orientation;
translating the second gripping assembly by a predetermined amount to a second position and orientation;
directing a stream of compressed air from the at least one blower nozzle or blower duct against the seafood;
closing the first and second gripping paddles by a predetermined amount;
rotating the second gripping assembly by a predetermined amount; and
injecting compressed air through the injection nozzle.

18. A system for processing seafood, the system comprising:
a translatable and rotatable gripping assembly comprising:
a first plurality of gripper fingers, and
a second plurality of gripper fingers,
wherein each of the second plurality of gripper fingers is disposed opposite a respective one of the first plurality of gripper fingers to form an individually controllable gripping unit; and
a vision subsystem configured to make one or more determinations related to controlling the system, the vision subsystem comprising:

at least one camera configured to capture or generate one or more images of the seafood;

at least one processor;

at least one memory comprising non-transient computer readable medium comprising code that, when executed by the at least one processor, causes the vision subsystem to:

cause the at least one camera to capture or generate the one or more images of the seafood;

analyze the one or more images of the seafood to determine an orientation of the seafood; and generate at least one indication of the determined orientation of the seafood for use by a control subsystem to generate one or more control signals for at least one of:

positioning the first gripping assembly such that the individually controllable gripping units are open and disposed in a first position and orientation, closing one or more of the individually controllable gripping units by a predetermined amount, and performing predetermined amounts of translating and rotating the first gripping assembly from the first position and orientation to a second position and orientation.

19. A method for processing seafood, the method comprising:

gripping a first portion of the seafood utilizing a first gripping assembly, the first gripping assembly comprising:

a first plurality of gripper fingers, and a second plurality of gripper fingers, wherein each of the second plurality of gripper fingers is disposed opposite a respective one of the first plurality of gripper fingers to form an individually controllable gripping unit;

utilizing the first gripping assembly to dispose a second portion of the seafood adjacent to a second gripping assembly, the second gripping assembly comprising:

a first gripping paddle comprising:

a blower rail extending from an edge of the gripping paddle, at least one blower nozzle or blower duct disposed on the blower rail and configured to direct a stream of compressed air, and an injector nozzle configured to eject compressed air, and a second gripping paddle configured to cooperate with the first gripping paddle;

directing a stream of compressed air from the at least one blower nozzle or blower duct against the seafood to, thereby, uncurl the second portion of the seafood;

closing the first and second gripping paddles to grip the uncurled second portion of the seafood, wherein closing the first and second gripping paddles simultaneously causes the injector nozzle to pierce a shell of the uncurled second portion of the seafood;

rotating the second gripping assembly with respect to the first gripping assembly to, thereby, separate the first portion of the seafood from the second portion of the seafood; and causing the injector nozzle to inject compressed air into the shell to, thereby, eject meat of the seafood from the shell.

20. The method of claim 19, further comprising determining portions of the ejected meat comprising entrails by:

causing at least one camera of a vision subsystem to capture or generate one or more images of the ejected meat; and analyzing the one or more images of the ejected meat to determine the portions of the ejected meat comprising the entrails.

21. The method of claim 20, further comprising evacuating the entrails from the ejected meat by:

extending a first subset of a plurality of immobilizing elements of an eviscerating subsystem to contact portions of the ejected meat not determined to comprise the entrails;

retracting a second subset of the plurality of immobilizing elements to avoid contact with portions of the ejected meat determined to comprise the entrails;

rotating a carrier on a slewing bearing of the eviscerating subsystem so as to dispose an extendible vacuum port adjacent an end of the ejected meat;

extending the extendible vacuum port to position a distal end of the vacuum port immediately adjacent the end of the ejected meat; and rotating the carrier on the slewing bearing such that the distal end of the vacuum port passes along a convex side of the ejected meat, thereby, eviscerating the entrails from the ejected meat.

* * * * *